(12) United States Patent
Salem et al.

(10) Patent No.: US 11,889,548 B2
(45) Date of Patent: Jan. 30, 2024

(54) CHANNEL ACCESS MECHANISMS IN MILLIMETER WAVE UNLICENSED BANDS

(71) Applicants: Mohamed Adel Salem, Kanata (CA); Keyvan Zarifi, Ottawa (CA)

(72) Inventors: Mohamed Adel Salem, Kanata (CA); Keyvan Zarifi, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 171 days.

(21) Appl. No.: 17/504,200

(22) Filed: Oct. 18, 2021

(65) Prior Publication Data

US 2022/0124796 A1    Apr. 21, 2022

Related U.S. Application Data

(60) Provisional application No. 63/094,136, filed on Oct. 20, 2020, provisional application No. 63/250,686, filed on Sep. 30, 2021.

(51) Int. Cl.
*H04W 74/02* (2009.01)
*H04W 74/00* (2009.01)
(Continued)

(52) U.S. Cl.
CPC .......... *H04W 74/02* (2013.01); *H04L 5/0051* (2013.01); *H04W 16/14* (2013.01); *H04W 74/006* (2013.01)

(58) Field of Classification Search
CPC ............... H04W 74/02; H04W 74/006; H04W 16/14; H04L 5/0051
See application file for complete search history.

(56) References Cited

U.S. PATENT DOCUMENTS

| 2015/0382374 A1 | 12/2015 | Bhorkar et al. |
| 2016/0309498 A1 | 10/2016 | Luo et al. |

(Continued)

FOREIGN PATENT DOCUMENTS

| CN | 110351881 A | 10/2019 |
| CN | 110752899 A | 2/2020 |
| CN | 111615854 A | 9/2020 |

OTHER PUBLICATIONS

3GPP TR 38.807 V16.0.0 (Dec. 2019), Study on requirements for NR beyond 52.6 GHZ (Release 16), 68 pages.
(Continued)

*Primary Examiner* — Derrick V Rose

(57) ABSTRACT

Some embodiments of the present disclosure provide for configuring channel access mechanisms in a mmWave shared spectrum mobile communication network. The channel access mechanisms are to be used by a user equipment (UE) and a serving node in the UE's serving cell. The configuring may use a single, cell-specific higher layer parameter or a combination of two cell-specific higher layer parameters. The parameters may configure the UE and the node to perform channel sensing before transmitting to initiate a channel occupancy. Alternatively, the UE and the node may be configured to transmit directly without channel sensing. The parameters may configure a receiver (the UE or the node) to perform channel sensing before transmitting a channel idle indication to the transmitter as part of a channel access procedure to initiate a channel occupancy. Alternatively, the parameters may configure the UE and the node to receive without channel sensing.

29 Claims, 9 Drawing Sheets

(51) Int. Cl.
  *H04L 5/00*    (2006.01)
  *H04W 16/14*   (2009.01)

(56) References Cited

U.S. PATENT DOCUMENTS

| | | | |
|---|---|---|---|
| 2020/0107364 A1 | 4/2020 | Xue et al. | |
| 2021/0243805 A1* | 8/2021 | Si .................. | H04B 7/0617 |
| 2021/0298045 A1* | 9/2021 | Kim .................. | H04W 72/0453 |
| 2022/0022048 A1* | 1/2022 | Si .................. | H04W 74/0808 |
| 2023/0131003 A1* | 4/2023 | Noh .................. | H04W 72/1268 |
| | | | 370/329 |

OTHER PUBLICATIONS

3GPP TSG RAN Meeting #88e, Electronic Meeting, Jun. 29-Jul. 3, 2020, RP-200902, Intel Corporation, Revised SID: Study on supporting NR from 52.6 GHz to 71 GHZ, 3 pages.

ETSI EN 302 567 V2.2.0 (Dec. 2020), Multiple Gigabit/s radio equipment operating in the 60 GHz band; Harmonised Standard for access to radio spectrum, 42 pages.

3GPP TSG RAN Meeting #86, Sitges, Spain, Dec. 9-12, 2019, RP-193229, Qualcomm, New WID on Extending current NR operation to 71 GHZ, 5 pages.

\* cited by examiner

CHANNEL ACCESS MECHANISMS IN MILLIMETER WAVE UNLICENSED BANDS

CROSS REFERENCE TO RELATED APPLICATIONS

This application claims the benefit of U.S. Provisional Patent Application No. 63/094,136 filed Oct. 20, 2020 and U.S. Provisional Patent Application No. 63/250,686 filed Sep. 30, 2021, which are hereby incorporated by reference in their entirety.

TECHNICAL FIELD

The present disclosure relates generally to channel access mechanisms and, in particular embodiments, to channel access mechanisms in mmWave unlicensed bands.

BACKGROUND

The 3rd Generation Partnership Project (3GPP) has extensively studied operation of 5G (fifth generation) mobile networks. 5G New Radio (NR) is a radio access technology (RAT) developed by the 3GPP for 5G mobile networks. Notably, frequency bands for 5G NR are considered to be classified into two different frequency ranges. The first frequency range is referenced as Frequency Range 1 (FR1). FR1 is defined to include frequency bands under 6 GHz. FR1 covers some frequency bands traditionally used by previous standards. FR1 also covers potential new spectrum offerings from 410 MHz to 7125 MHz. The second frequency range is referenced as Frequency Range 2 (FR2). FR2 is defined to include frequency bands from 24.25 GHz to 52.6 GHz, known as a "millimeter wave" or "mmWave" frequency range.

Recently, in a Technical Report (TR) studying operation of NR beyond 52.6 GHz, it was decided to extend FR2 operation up to 71 GHz (see 3GPP TR 38.807, "Study on requirements for NR beyond 52.6 GHz"). The extended frequency range of FR2, i.e., from 52.6 GHz to 71 GHz, is referred to as FR2-2 whereas the original frequency range of FR2 is referred to as FR2-1.

It is known that mmWave operation leads to increased path loss relative to lower frequencies. However, it is also known that wireless nodes can be equipped with a large number of antenna elements. Accordingly, it is expected that these wireless nodes may engage in beamforming and highly directional transmissions to combat the path loss.

The 3GPP has published a study item description (SID) that focuses on support for extending the operation of NR to the frequencies between 52.6 GHz and 71 GHz (see RP-200901 Revised SID: "Study on supporting NR from 52.6 GHz to 71 GHz," RAN #88e). The referenced SID addresses channel access mechanisms by considering three factors. A first factor is potential interference to/from other nodes while assuming beam-based operation. A second factor is compliance with regulatory requirements applicable to unlicensed spectrum, i.e., the 60 GHz shared spectrum. A third factor is coexistence with other incumbent radio access technologies (RATs) such as 802.11ad Directional Multi-Gigabit (DMG) or WiGig and/or 802.11 ay Enhanced DMG (EDMG).

In addition, the 3GPP has published a work item description (WID) that focuses on supporting the extension of NR operation up to 71 GHz (see RP-193229 "New WID on Extending current NR operation to 71 GHz," RAN #86). The WID considers both licensed and unlicensed operation. It is known that 5G New Radio-based access to Unlicensed (NR-U) is a RAT that is designed to operate in the 5 and 6 GHz bands alongside Wi-Fi. The WID proposes leveraging procedures adopted for NR-U as procedures for operating in the unlicensed 60 GHz band. Some physical layer aspects and procedures were identified as objectives of the WID. In particular, for new numerology introduced, timeline-related aspects are considered. The WID considers support of up to 64 synch block SSB beams for licensed and unlicensed operation. The WID further considers channel access mechanisms, assuming beam-based operation in compliance with regulatory requirements applicable to the 60 GHz unlicensed spectrum. The WID also notes that, for operation in the proposed extended frequency band, NR/NR-U operation can be stand-alone operation or aggregated operation, via carrier aggregation (CA) or dual connectivity (DC) with an anchor carrier.

SUMMARY

Aspects of the present application enable configuration of, and switching between, different variants of channel access mechanisms with and without LBT, depending on region-specific requirements and a desire for improved performance. The variants of channel access mechanisms include a receiver-only LBT (receiver-only channel sensing), which mechanism may be shown to reduce LBT overhead relative to some known receive-assisted LBT mechanisms.

Operation using the receiver-only LBT channel access mechanism may be shown to increase spatial reuse, in a manner similar to operation without using LBT, while mitigating a known issue, the so-called "hidden node" issue sometimes found in channel access mechanism that rely on transmitter-only LBT or eschew using LBT. The proposed receiver-only LBT channel access mechanism may be shown to relax switching time between a time of receipt of an idle indication from an intended receiver and a time of transmission in those instances wherein the intended receiver is configured to initiate channel occupancy. The proposed receiver-only LBT channel access mechanism may be further shown to allow for configuration of a performance-centric energy detection threshold for receiver channel sensing when the intended receiver is not initiating channel occupancy.

According to an aspect of the present disclosure, there is provided a method for operating a user equipment (UE) in a millimeter wave shared spectrum. The method including receiving, by the UE, at least one higher layer parameter, the at least one higher layer parameter providing a semi-static configuration to the UE to operate with shared spectrum access in a serving cell within the millimeter wave shared spectrum in accordance with one of a channel access mode with Listen Before Talk (LBT) and a channel access mode without LBT (No-LBT) and transmitting, by the UE, an uplink (UL) transmission burst on a channel in the serving cell to, thereby, initiate channel occupancy on the channel. In the channel access mode with LBT, the transmitting is subsequent to determining that the channel is idle using channel sensing on the channel in accordance with the semi-static configuration of the channel access mode with LBT provided by the at least one higher layer parameter. In the channel access mode without LBT, the transmitting is directly performed by the UE in accordance with the semi-static configuration of the channel access mode without LBT provided by the at least one higher layer parameter.

According to an aspect of the present disclosure, there is provided a device configured for operation in a millimeter wave shared spectrum. The device includes a memory storing instructions and a processor. The processor is caused, by executing the instructions, to receive at least one higher layer parameter, the at least one higher layer parameter providing a semi-static configuration to the device to operate with shared spectrum access in a serving cell within the millimeter wave shared spectrum in accordance with one of a channel access mode with Listen Before Talk (LBT) and a channel access mode without LBT (No-LBT) and transmit an uplink (UL) transmission burst on a channel in the serving cell to, thereby, initiate channel occupancy on the channel. In the channel access mode with LBT, the processor is caused to transmit subsequent to determining that the channel is idle using channel sensing on the channel in accordance with the semi-static configuration of the channel access mode with LBT provided by the at least one higher layer parameter. In the channel access mode without LBT, the processor is caused to transmit directly in accordance with the semi-static configuration of the channel access mode without LBT provided by the at least one higher layer parameter.

BRIEF DESCRIPTION OF THE DRAWINGS

For a more complete understanding of the present embodiments, and the advantages thereof, reference is now made, by way of example, to the following descriptions taken in conjunction with the accompanying drawings, in which.

DETAILED DESCRIPTION OF ILLUSTRATIVE EMBODIMENTS

For illustrative purposes, specific example embodiments will now be explained in greater detail in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include, or otherwise have access to, a non-transitory computer/processor readable storage medium or media for storage of information, such as computer/processor readable instructions, data structures, program modules and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e., DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Figure 1:
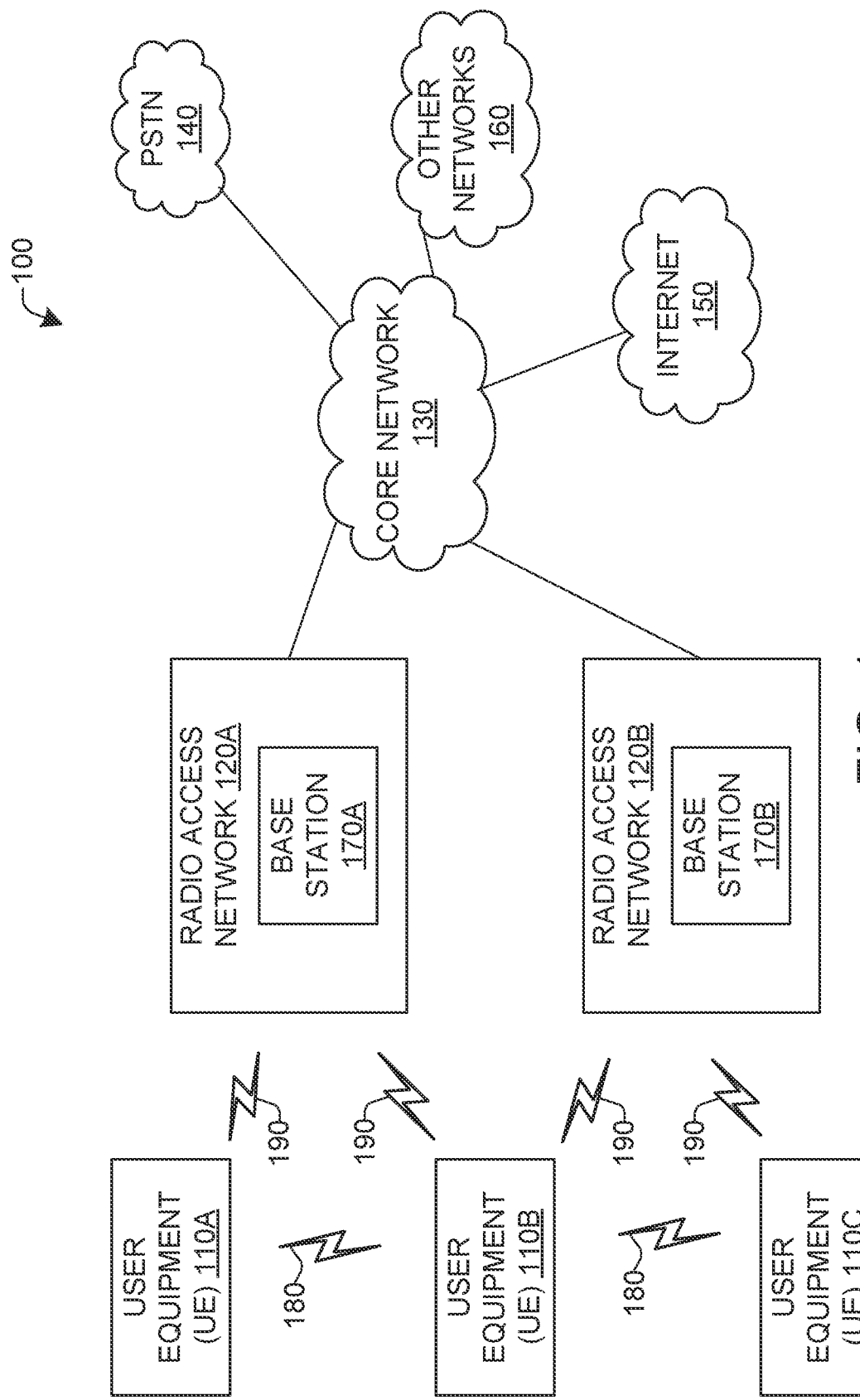
FIG. 1 is a schematic diagram of a communication system in which embodiments of the disclosure may occur, the communication system includes an example user equipment and an example base station.

FIG. 1 illustrates, in a schematic diagram, an example communication system 100. In general, the communication system 100 enables multiple wireless or wired elements to communicate data and other content. The purpose of the communication system 100 may be to provide content (voice, data, video, text) via broadcast, narrowcast, user device to user device, etc. The communication system 100 may operate efficiently by sharing resources, such as bandwidth.

In this example, the communication system 100 includes a first user equipment (UE) 110A, a second UE 110B and a third UE 110C (individually or collectively 110), a terrestrial radio access network (RAN) 120A and a non-terrestrial RAN 120B (individually or collectively 120), a core network 130, a public switched telephone network (PSTN) 140, the Internet 150 and other networks 160. Although certain numbers of these components or elements are shown in FIG.

1, any reasonable number of these components or elements may be included in the communication system 100.

The UEs 110 are configured to operate, communicate, or both, in the communication system 100. For example, the UEs 110 are configured to transmit, receive, or both via wireless communication channels. Each UE 110 represents any suitable end user device for wireless operation and may include such devices (or may be referred to) as a wireless transmit/receive unit (WTRU), a mobile station, a mobile subscriber unit, a cellular telephone, a station (STA), a machine-type communication device (MTC), an Internet of Things (IoT) device, a personal digital assistant (PDA), a smartphone, a laptop, a computer, a touchpad, a wireless sensor or a consumer electronics device.

In FIG. 1, the terrestrial RAN 120A includes a terrestrial base station (BS) 170A and the non-terrestrial RAN includes a non-terrestrial base station 170B (individually or collectively 170). The base station 170 may also be called an anchor or a transmit point (TP). Each base station 170 is configured to wirelessly interface with one or more of the UEs 110 to enable access to any other base station 170, the core network 130, the PSTN 140, the internet 150 and/or the other networks 160. For example, the base stations 170 may include (or be) one or more of several well-known devices, such as a base transceiver station (BTS), a Node-B (NodeB), an evolved NodeB (eNodeB), a Home eNodeB ("eNB"), a gNodeB ("gNB"), a transmission and receive point (TRP), a site controller, an access point (AP) or a wireless router. Any UE 110 may alternatively or additionally be configured to interface, access or communicate with any other base station 170, the internet 150, the core network 130, the PSTN 140, the other networks 160 or any combination of the preceding. The communication system 100 may include RANs, such as the RAN 120B, wherein the corresponding base station 170B accesses the core network 130 via the internet 150, as shown.

The UEs 110 and the base stations 170 are examples of communication equipment that can be configured to implement some or all of the functionality and/or embodiments described herein. In the embodiment shown in FIG. 1, the terrestrial base station 170A forms part of the terrestrial RAN 120A, which may include other base stations (not shown), base station controller(s) (BSC, not shown), radio network controller(s) (RNC, not shown), relay nodes (not shown), elements (not shown) and/or devices (not shown). Any base station 170 may be a single element, as shown, or multiple elements, distributed in the corresponding RAN 120, or otherwise. Also, the non-terrestrial base station 170B forms part of the non-terrestrial RAN 120B, which may include other base stations, elements and/or devices. Each base station 170 transmits and/or receives wireless signals within a particular geographic region or area, sometimes referred to as a "cell" or "coverage area." A cell may be further divided into cell sectors and a base station 170 may, for example, employ multiple transceivers to provide service to multiple sectors. In some embodiments, there may be established pico or femto cells where the radio access technology supports such. In some embodiments, multiple transceivers could be used for each cell, for example using multiple-input multiple-output (MIMO) technology. The number of RANs 120 shown is exemplary only. Any number of RANs may be contemplated when devising the communication system 100.

The base stations 170 communicate with one or more of the UEs 110 over one or more air interfaces 190 using wireless communication links, e.g., radio frequency (RF) wireless communication links, microwave wireless communication links, infrared (IR) wireless communication links, visible light (VL) communications links, etc. The air interfaces 190 may utilize any suitable radio access technology. For example, the communication system 100 may implement one or more orthogonal or non-orthogonal channel access methods, such as code division multiple access (CDMA), time division multiple access (TDMA), frequency division multiple access (FDMA), space division multiple access (SDMA), orthogonal FDMA (OFDMA) or single-carrier FDMA (SC-FDMA) in the air interfaces 190.

A base station 170 may implement Universal Mobile Telecommunication System (UMTS) Terrestrial Radio Access (UTRA) to establish the air interface 190 using wideband CDMA (WCDMA). In doing so, the base station 170 may implement protocols such as High Speed Packet Access (HSPA), Evolved HPSA (HSPA+) optionally including High Speed Downlink Packet Access (HSDPA), High Speed Packet Uplink Access (HSUPA) or both. Alternatively, a base station 170 may establish the air interface 190 with Evolved UTMS Terrestrial Radio Access (E-UTRA) using LTE, LTE-A, LTE-B and/or 5G New Radio (NR). It is contemplated that the communication system 100 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE and GERAN. Of course, other multiple access schemes and wireless protocols may be utilized.

The RANs 120 are in communication with the core network 130 to provide the UEs 110 with various services such as voice communication services, data communication services and other communication services. The RANs 120 and/or the core network 130 may be in direct or indirect communication with one or more other RANs (not shown), which may or may not be directly served by the core network 130 and may or may not employ the same radio access technology as the terrestrial RAN 120A, the non-terrestrial RAN 120B or both. The core network 130 may also serve as a gateway access between (i) the RANs 120 or the UEs 110 or both, and (ii) other networks (such as the PSTN 140, the Internet 150 and the other networks 160).

The UEs 110 may communicate with one another over one or more sidelink (SL) air interfaces 180 using wireless communication links, e.g., radio frequency (RF) wireless communication links, microwave wireless communication links, infrared (IR) wireless communication links, visible light (VL) communications links, etc. The SL air interfaces 180 may utilize any suitable radio access technology and may be substantially similar to the air interfaces 190 over which the UEs 110 communicate with one or more of the base stations 170 or they may be substantially different. For example, the communication system 100 may implement one or more channel access methods, such as CDMA, TDMA, FDMA, SDMA, OFDMA or SC-FDMA in the SL air interfaces 180. In some embodiments, the SL air interfaces 180 may be, at least in part, implemented over unlicensed spectrum.

Some or all of the UEs 110 may include functionality for communicating with different wireless networks over different wireless links using different wireless technologies and/or protocols. Instead of wireless communication (or in addition thereto), the UEs 110 may communicate via wired communication channels to a service provider or a switch (not shown) and to the Internet 150. The PSTN 140 may include circuit switched telephone networks for providing plain old telephone service (POTS). The Internet 150 may include a network of computers and subnets (intranets) or both and incorporate protocols, such as internet protocol (IP), transmission control protocol (TCP) and user datagram protocol (UDP). The UEs 110 may be multimode devices capable of operation according to multiple radio access technologies and incorporate multiple transceivers necessary to support multiple radio access technologies.

Figure 2:
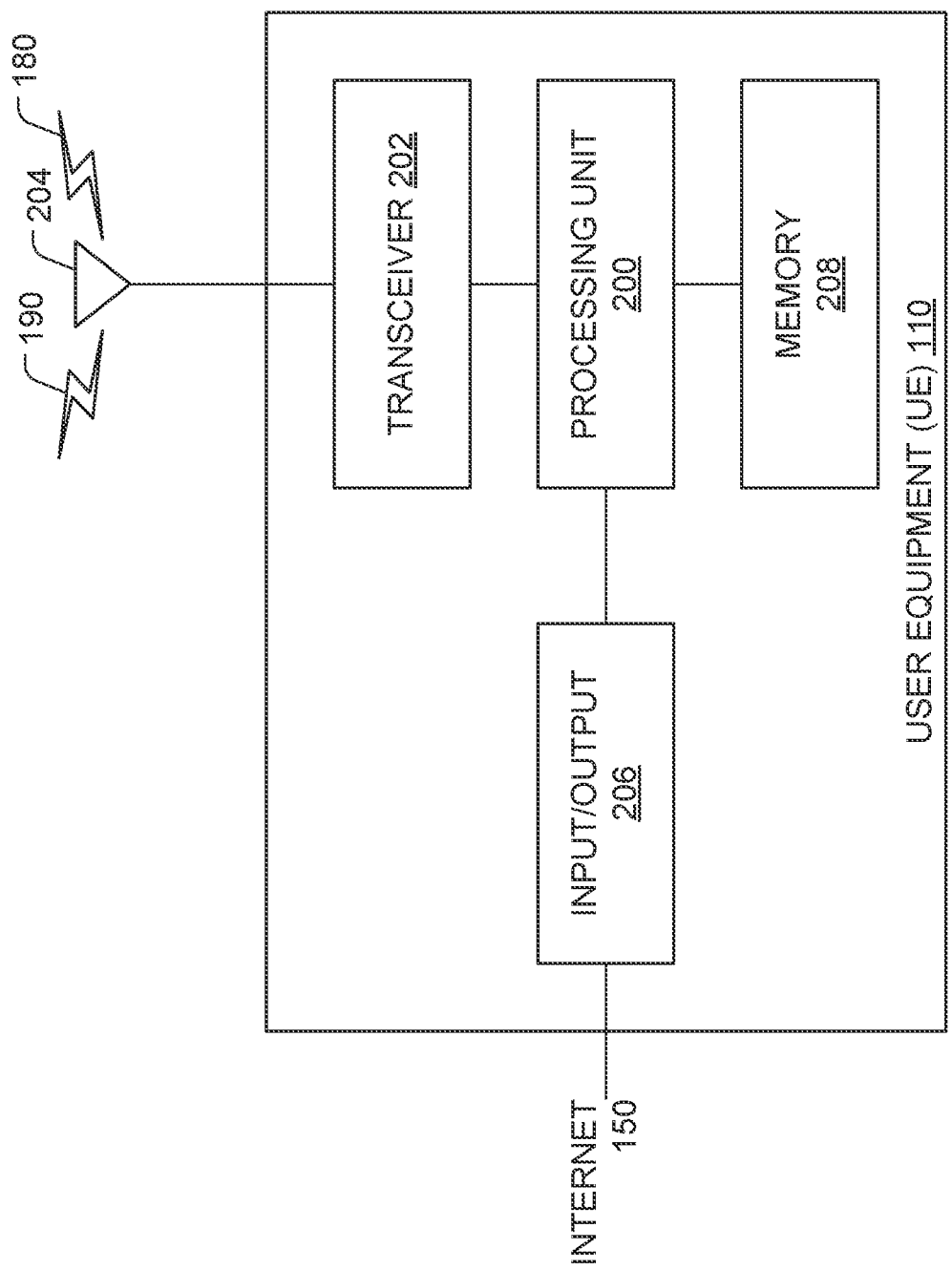
FIG. 2 illustrates, in a block diagram, an example user equipment of the communication system of FIG. 1, in accordance with aspects of the present application.
Figure 3:
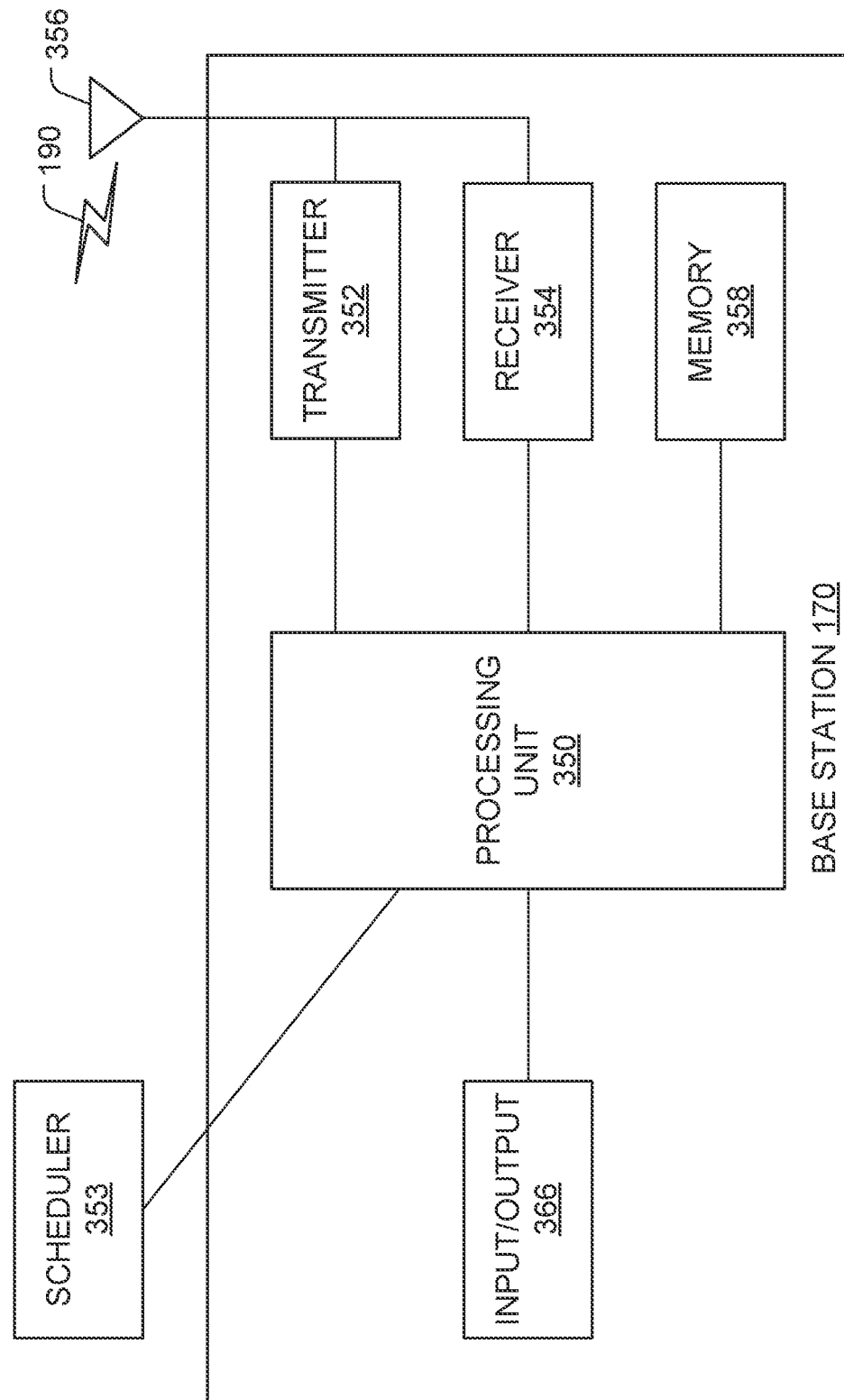
FIG. 3 illustrates, in a block diagram, an example base station of the communication system of FIG. 1, in accordance with aspects of the present application.

FIGS. 2 and 3 illustrate example devices that may implement the methods and teachings according to this disclosure. In particular, FIG. 2 illustrates an example UE 110 and FIG. 3 illustrates an example base station 170. These components could be used in the communication system 100 of FIG. 1 or in any other suitable system.

As shown in FIG. 2, the UE 110 includes at least one UE processing unit 200. The UE processing unit 200 implements various processing operations of the UE 110. For example, the UE processing unit 200 could perform signal coding, data processing, power control, input/output processing, or any other functionality enabling the UE 110 to operate in the communication system 100. The UE processing unit 200 may also be configured to implement some or all of the functionality and/or embodiments described in more detail above. Each UE processing unit 200 includes any suitable processing or computing device configured to perform one or more operations. Each UE processing unit 200 could, for example, include a microprocessor, microcontroller, digital signal processor, field programmable gate array, or application specific integrated circuit.

The UE 110 also includes at least one transceiver 202. The transceiver 202 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the UE 110. One or multiple antennas 204 could be used in the ED 110. Although shown as a single functional unit, a transceiver 202 could also be implemented using at least one transmitter and at least one separate receiver.

The UE 110 further includes one or more input/output devices 206 or interfaces (such as a wired interface to the Internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the UE 110 includes at least one UE memory 208. The UE memory 208 stores instructions and data used, generated, or collected by the ED 110. For example, the UE memory 208 could store software instructions or modules configured to implement some or all of the functionality and/or embodiments described above and that are executed by the UE processing unit(s) 200. Each UE memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 3, the base station 170 includes at least one BS processing unit 350, at least one transmitter 352, at least one receiver 354, one or more antennas 356, at least one memory 358, and one or more input/output devices or interfaces 366. A transceiver, not shown, may be used instead of the transmitter 352 and receiver 354. A scheduler 353 may be coupled to the BS processing unit 350. The scheduler 353 may be included within or operated separately from the base station 170. The BS processing unit 350 implements various processing operations of the base station 170, such as signal coding, data processing, power control, input/output processing, or any other functionality. The BS processing unit 350 can also be configured to implement some or all of the functionality and/or embodiments described in more detail above. Each BS processing unit 350 includes any suitable processing or computing device configured to perform one or more operations. Each BS processing unit 350 could, for example, include a microprocessor, microcontroller, digital signal processor, field programmable gate array, or application specific integrated circuit.

Each transmitter 352 includes any suitable structure for generating signals for wireless or wired transmission to one or more UEs or other devices. Each receiver 354 includes any suitable structure for processing signals received wirelessly or by wire from one or more UEs or other devices. Although shown as separate components, at least one transmitter 352 and at least one receiver 354 could be combined into a transceiver. Each antenna 356 includes any suitable structure for transmitting and/or receiving wireless or wired signals. Although a common antenna 356 is shown here as being coupled to both the transmitter 352 and the receiver 354, one or more antennas 356 could be coupled to the transmitter(s) 352, and one or more separate antennas 356 could be coupled to the receiver(s) 354. Each memory 358 includes any suitable volatile and/or non-volatile storage and retrieval device(s) such as those described above in connection to the UE 110. The memory 358 stores instructions and data used, generated, or collected by the base station 170. For example, the memory 358 could store software instructions or modules configured to implement some or all of the functionality and/or embodiments described above and that are executed by the BS processing unit(s) 350.

Each input/output device 366 permits interaction with a user or other devices in the network. Each input/output device 366 includes any suitable structure for providing information to or receiving/providing information from a user, including network interface communications.

The frequency band extending from 57 GHz to 66 GHz is known to be largely available in regions such as the USA, Canada, the European Union (EU) and Japan. The same range is known to be partially available in other regions such as China, South Korea and Australia. The frequency band extending from 57 GHz to 71 GHz is available in the USA and Canada. Based on the recent decisions of the European Conference of Postal and Telecommunications Administrations, Electronic Communications Committee (CEPT ECC), the frequency band extending from 57 GHz to 71 GHz will also be available in the EU.

In the requirements set out by the International Telecommunications Union (ITU-R) for Multiple Gigabit Wireless Systems (MGWS) operating in the 60 GHz band, a maximum channel bandwidth of 2.16 GHz is considered and bonding of channels is allowed. The European Telecommunications Standards Institute (ETSI) specified the regulatory requirements for MGWS operating in the 60 GHz band excluding fixed outdoor installations (see ETSI EN 302 567, "Multiple-Gigabit/s radio equipment operating in the 60 GHz band; Harmonised Standard covering the essential requirements of article 3.2 of Directive 2014/53/EU," V2.1.1, 2017-07).

Therefore, the 802.11ad Directional Multi-Gigabit (DMG) and 802.11ay Enhanced DMG (EDMG) support channel bonding of contiguous channels and/or aggregation of non-contiguous channels, thereby rendering the following possible transmission bandwidths of a Physical Protocol Data Unit (PPDU): 2.16 GHz; 4.32 GHz; 6.48 GHz; 8.64 GHz; 2.16+2.16 GHz; and 4.32+4.32 GHz.

Through a review of current, region-specific regulatory requirements, it can be observed that a minimum Occupied Channel Bandwidth (OCB) containing 99% of the power of the signal is not required in the US region and the China region. This is also the case for Japan, South Korea, Australia and Singapore. Whereas, in the EU, the OCB is required to be between 70% and 100% of the declared Nominal Channel Bandwidth according to the Harmonized Standard (HS) for both MGWS and Wideband Data Transmission Systems for fixed network radio equipment (WDTS-fixed, see ETSI EN 303 722, V0.0.4, 2020-05-18). Notably, for MGWS, there is no requirement on the nominal center frequencies and nominal channel bandwidth. A given manufacturer can declare a nominal channel bandwidth when a product is tested. Nevertheless, 802.11 DMG/EDMG systems currently support multiples of 2.16 GHz channels (i.e., 2.16 GHz, 4.32 GHz, 6.48 GHz and 8.64 GHz).

For the MGWS, the maximum Power Spectral Density (PSD) has been relaxed from 13 dBm/MHz to 23 dBm/MHz by the latest CEPT ECC decisions. Together with the total Radio Frequency (RF) Effective Isotropic Radiated Power (EIRP) limit of 40 dBm, the minimum transmission bandwidth (BW) using full power is determined to be 50 MHz. A transmitting device can, thus, increase the transmission BW at the expense of reducing the PSD below the maximum PSD. It is also noted that a higher PSD limit is allowed for WDTS-fixed given that a high antenna gain (≥30 dBi) is used at transmission.

A contention-based protocol is a communications protocol for operating wireless telecommunication equipment that allows many users to use the same radio channel without pre-coordination. The "listen before talk" (LBT) protocol is a contention-based protocol by which an equipment applies Clear Channel Assessment (CCA) before using the channel. The known Carrier Sense Multiple Access/Collision Avoidance (CSMA/CA) operating procedure in IEEE 802.11 is the most well-known form of LBT contention-based protocol.

LBT is mandatory in the EU for MGWS under a category called "Adaptivity" as a medium access protocol to facilitate spectrum sharing through energy-detection based CCA. LBT has not been mandated yet in the EU for fixed outdoor deployments of Wideband Data Transmission Systems (WDTS-fixed). Regions where LBT is not mandatory include the US, China, Japan, South Korea, Australia and Singapore. Currently, there are two ongoing work items (WIs) in the ETSI Broadband Radio Access Networks (BRAN) technical committee, including a WI for specifying the channel access mechanism (Adaptivity) for Fixed Network Radio Equipment and Mobile Network Radio Equipment operating in the frequency band that extends from 57 GHz to 71 GHz.

On the one hand, the energy detection threshold (EDT) used for CCA is not applicable to the US, China and the regions in which LBT is not mandatory. On the other hand, for the EU, so far only the HS for MGWS regulates the EDT to be $$-47 \ dBm + 10 \times \log_{10} \frac{P_{Max}}{P_{out}} \text{ where } P_{out}$$

is the RF output power (EIRP) and $P_{Max}$ is the maximum power level (EIRP), which is set to 40 dBm.

There are a number of channel access mechanisms considered for NR devices to initiate a channel occupancy (CO) in the 60 GHz band. Channel access mechanisms that are traditionally performed by the transmitter include: (Quasi-)omni directional LBT; directional LBT; and no LBT. Each of these mechanisms has pros and cons.

An omni-directional LBT channel access mechanism is used in RATs operating in lower frequency bands (5 and 6 GHz) such as licensed-assisted access (LAA), NR-U and IEEE 802.11ac/ax. When operating according to Omni-directional LBT, a device senses energy in a channel from all directions without incorporating array gain. A quasi-omni-directional LBT channel access mechanism is known to be used in IEEE 802.11ad/ay, wherein the device senses the channel on a wide beam that encompasses all possible transmission directions. The omni-directional LBT channel access mechanism may be considered to be relatively easy to implement based on reuse of the known Rel-16 NR-U LBT channel access mechanism. However, the (quasi-)omni-directional LBT channel access mechanism may be seen to lead to an "over protection" problem and, thus, reduction of spatial reuse, since potential transmissions with tolerable/harmless interference to the reception of on-going transmissions may be blocked. This is sometimes referenced as an "exposed node problem."

A directional LBT channel access mechanism is known to have potential to improve channel access probability and to enhance spatial reuse. However, when the directional LBT channel access mechanism is performed at the transmitting side, the known "hidden node problem" could be more severe. That is, there may by interference, at the receiver, from other nodes that were not detected by the LBT carried out at the transmitter. The failure of the transmitter to detect the other nodes may be due to limited sensing direction. Further drawbacks include an increase in complexity and an increase in LBT overhead when a BS 170 is to serve multiple UEs 110 in different directions using, e.g., beam sweeping.

A channel access mechanism that uses no LBT may be defined by direct transmission without the transmitter sensing the channel. Such direct transmission has been adopted in IEEE 802.11ad/ay within the Service Period or in time division multiplexing mode. The no-LBT channel access mechanism can be used to initiate a CO for highly directional transmissions, e.g., point-to-point links with beamforming gain >X dBi or in a region wherein LBT is not mandated by regulations. The no LBT channel access mechanism has benefits such as a lack of overhead and direct reuse of NR operations in the licensed band. However, the no-LBT channel access mechanism can lead to significant interference at high load, especially for cell-edge UEs 110. Furthermore, it may be expected that the hidden node issue would be worse for the no-LBT channel access mechanism than for the directional LBT channel access mechanism.

Another channel access mechanism considered is based on a handshake mechanism between the transmitter and the receiver before the transmitter occupies the channel. In other words it is a receiver-assisted LBT channel access mechanism.

The receiver-assisted LBT channel access mechanism potentially resolves the known hidden node issue. The earliest version of such a channel access mechanism is the IEEE 802.11 "Request-To-Send/Clear-To-Send" channel reservation mechanism, in which a source node senses the channel using omni-directional LBT and transmits a request-to-send (RTS) frame indicating a duration for which the source node intends to occupy the channel.

Upon receiving the RTS frame, the destination node responds with a clear-to-send (CTS) frame immediately after a short inter-frame spacing (SIFS). The CTS frame indicates the same ending time point of the CO that was indicated in the RTS frame. Some nodes are hidden nodes from the perspective of the source node. These hidden nodes receive the CTS frame and, responsively, refrain from accessing the channel by setting their network allocation vector (NAV) accordingly. The source node then proceeds with transmission immediately after a SIFS following the end of the CTS frame, without further channel sensing.

Especially in the 60 GHz unlicensed band, due to the large path loss and beamforming, transmitter-side LBT may be shown to suffer from hidden node issues and exposed node issues. As a consequence, receiver-assisted LBT has been proposed as a channel access mechanism in the 60 GHz unlicensed band (see the Appendix).

For downlink (DL) transmission, the UE 110 may receive specifications for a spatial filter via a physical downlink control channel (PDCCH). The UE 110 may perform directional channel sensing (LBT) using the specified spatial filter. The UE 110 may also receive the DL transmissions over a physical downlink shared channel (PDSCH) using the same spatial filter, thereby minimizing interference from others. At the transmitting end, the BS 170 may perform omni-directional channel sensing.

Similarly, for UL transmissions, the BS 170 may schedule UL transmissions over a physical uplink shared channel (PUSCH) and may specify a spatial filter, for the PUSCH transmission, via a UL scheduling grant transmitted on the PDCCH. The BS 170 may perform directional channel sensing using a spatial receive filter associated with the specified spatial filter to access the channel and transmit the PDCCH. The BS 170 may subsequently receive the UL transmissions over the PUSCH using the same spatial receive filter, thereby minimizing interference from others. At the transmitting end, the UE 110 may perform omni-directional channel sensing.

In general, it may be shown in system-level performance results that, when compared to the no-LBT approach, the transmitter-side LBT approach degrades the capacity for highly directional transmissions under low to medium load. The degraded capacity may be considered to be due to reduced spatial reuse and increased LBT overhead without a significant gain from the interference coordination. In contrast, under a high traffic load, with fewer exposed nodes, it may be shown that performance gains from interference coordination can be realized.

It may also be shown, from system-level performance results, that receiver-assisted directional LBT is beneficial for the cell-edge users who would have been otherwise experiencing high levels of interference at the receiving end due to transmissions by nodes hidden to the serving BS 170. Such benefits may be shown to be more significant under medium to high traffic loads.

Aspects of the present application enable configuration of, and switching between, different variants of channel access mechanisms with and without LBT, depending on region-specific requirements and a desire for improved performance.

In general, the UE 110 operating in a mmWave shared spectrum may receive two cell-specific parameters related to channel access mechanisms.

The first parameter, in a first case, configures the UE 110 to perform channel sensing before transmitting the transmissions that are used to initiate a channel occupancy. The first parameter, in a second case, configures the UE 110 to transmit directly, that is, without channel sensing.

The second parameter, in a first case, configures the UE 110 to perform channel sensing before transmitting the transmissions, to the transmitter, that are used to indicate an idle channel as part of a channel access procedure to initiate a channel occupancy. The second parameter, in a second case, configures the UE 110 to receive without channel sensing.

Aspects of the present application relate to a receive-only directional channel sensing mechanism, aspects of which depend on whether LBT is mandated or LBT is not mandated.

Various aspects of the present application relate to configurations including: transmitter-only channel sensing; receiver-only channel sensing; channel sensing performed by both the transmitter and the receiver; and no channel sensing performed at all. Notably, it is not necessarily expected that a given UE 110 will always be provided with combinations of the parameters corresponding to all of these configurations. Indeed, scenarios are bound to exist wherein at least one of these configurations is invalid.

According to aspects of the present application, the BS 170 may configure a UE serving cell for operation in a mmWave shared spectrum, e.g., the 60 GHz unlicensed spectrum. A UE serving cell may also be called a component carrier (CC). The configuration may be accomplished by transmitting, to the UE 110, an information element (IE) that includes one or more cell-specific parameters.

In 5G NR, a UE 110 may operate in one of the following three radio resource control (RRC) states: an RRC_IDLE state; an RRC_CONNECTED state; and an RRC_INACTIVE state. In other documentation, these states may be referenced as "modes", for example, "RRC_IDLE mode." When the UE 110 is in the RRC_CONNECTED state, the UE 110 may be considered to have been connected to a BS 170 as a result of a connection establishment procedure. When the UE 110 has transitioned to the RRC_IDLE state, say, by way of a release procedure, the UE 110 is not connected to the BS 170, but the BS 170 knows that the UE 110 is present in the network. By switching to the RRC_INACTIVE state, for example, by way of a release with suspend procedure, the UE 110 helps save network resources and UE power (thereby lengthening, for example, perceived battery life). The RRC_INACTIVE state is known to be useful, for example, in those instances when the UE 110 is not communicating with the BS 170. When the UE 110 is in the RRC_INACTIVE state, the BS 170 and the UE 110 both store at least some configuration information to, thereby, allow the UE 110 to reconnect to the BS 170, by way of a resume procedure, more rapidly than the UE 110 would be able to reconnect, by way of the connection establishment procedure, in the case wherein the UE 110 is in the RRC_IDLE state. The storage of at least some configuration information when the UE 110 is in the RRC_INACTIVE state is one aspect that distinguishes the RRC_INACTIVE state from the RRC_IDLE state.

When the UE 110 is in the RRC_INACTIVE mode or in the RRC_IDLE mode, the manner in which the information may be signaled to the UE 110 may include so-called "common signaling." When the UE 110 is in the RRC_CONNECTED mode, the manner in which the information may be signaled to the UE 110 may include "UE-specific signaling" or "dedicated signaling."

It follows that, when the UE 110 is in the RRC_IDLE mode, the BS 170 may transmit an IE containing a parameter to the UE 110 using common signaling. Example blocks of common signaling that may be used to transmit the IE include the known synchronization signal block (SSB), the known master information block (MIB) and the known system information block (SIB).

It also follows that, when the UE 110 is in the RRC_CONNECTED mode, the BS 170 may transmit an IE containing a parameter to the UE 110 using dedicated signaling. The dedicated signaling may be related to configuring the UE 110 with a secondary cell (SCell) or related to configuring the UE 110 with a secondary cell group (SCG).

The common signaling and the dedicated signaling have in common that they are both communicated at a layer higher than the physical layer, i.e., Layer 1 in the known Open Systems Interconnection model. Due to the transmission of the IE to the UE 110 by way of common signaling or dedicated signaling, the parameter may be referenced as a higher-layer parameter. The term "higher-layer" indicating that the parameter is transmitted to the UE 110 using communication on a layer that is higher than Layer 1. Of course, as is known, the signaling will still pass through the physical layer.

Because aspects of the present application relate to shared spectrum channel access, it may be instructive to review a 3GPP technical specification known as TS 37.213, Group Radio Access Network; Physical layer procedures for shared spectrum channel access, V16.2.0, June 2020, which may be referenced hereinafter as "Release 16."

In a first broad aspect of the present application, related to transmitter-only channel sensing, it should be clear that the transmitter is the BS 170 for DL transmissions and the transmitter is the UE 110 for UL transmissions. According to this first broad aspect, the BS 170 may transmit, to the UE 110, the IE including a first parameter indicating that channel sensing is to be performed by the transmitter.

Figure 4:
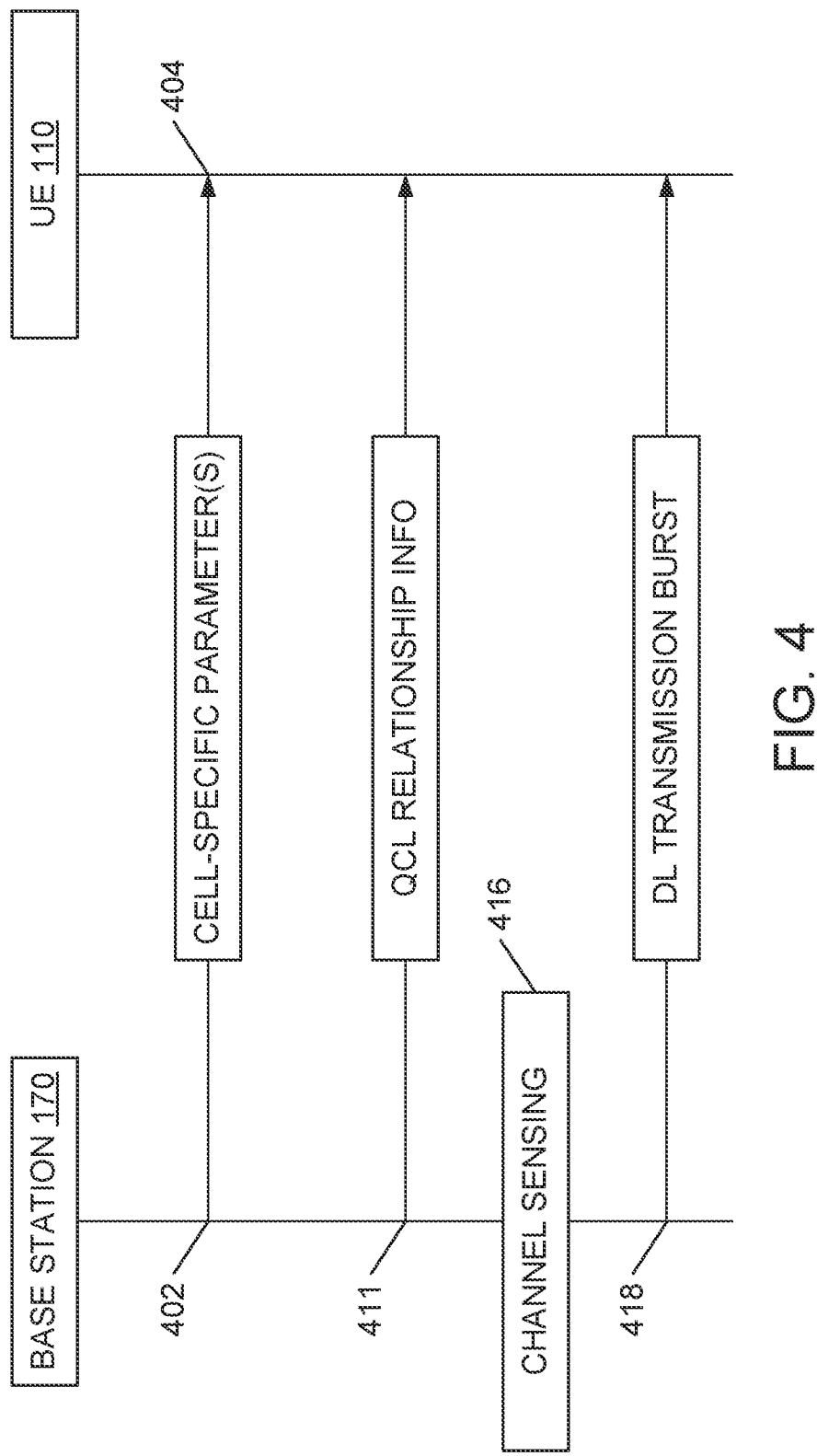
FIG. 4 illustrates, in a signal flow diagram for a downlink scenario wherein the transmitter performs channel sensing, an exchange of signaling between the user equipment of FIG. 2 and the base station of FIG. 3 to inform the user equipment that channel sensing is to be performed at the transmitter, according to aspects of the present application.

In a DL scenario, the BS 170 is to perform channel sensing on a channel within the bandwidth of the serving cell of the UE 110. FIG. 4 illustrates, in a signal flow diagram for the DL scenario, an exchange of signaling between the UE 110 and the BS 170 to inform the UE 110 that channel sensing is to be performed by the transmitter. The BS 170 may inform the UE 110 that the channel sensing is to be performed by the transmitter by transmitting (step 402), to the UE 110, an IE that includes one or more cell-specific parameters. The UE 110 receives (step 404) the IE and determines that a first parameter indicates that channel sensing is to be performed by the transmitter before transmitting to initiate a CO. It should be clear that the configuration is semi-static. That is, the transmission (step 402) of the IE with the first parameter need not be sent dynamically before each DL transmission. The BS 170 performs (step 416) channel sensing in accordance with the first parameter. Responsive to sensing (step 416) the channel to be idle, the BS 170 may transmit (step 418) a DL transmission burst to initiate a CO. A DL transmission burst is defined, in Release 16, as a set of transmissions from an eNB/gNB without any gaps greater than 16 μs. For operation in a mmWave shared spectrum, a DL transmission burst may be defined as a set of transmissions from a BS 170 without any gaps, or with gaps no greater than X μs (X μs may be 3 μs or 8 μs). In the latter case, transmissions from a BS 170 that are separated by a gap of more than X μs are considered as separate DL transmission bursts. A BS 170 may transmit transmission(s) after a gap within a DL transmission burst without sensing the corresponding channel(s) for availability.

In a UL scenario, the UE 110 performs channel sensing on a channel within the bandwidth of the serving cell of the UE 110.

Figure 5:
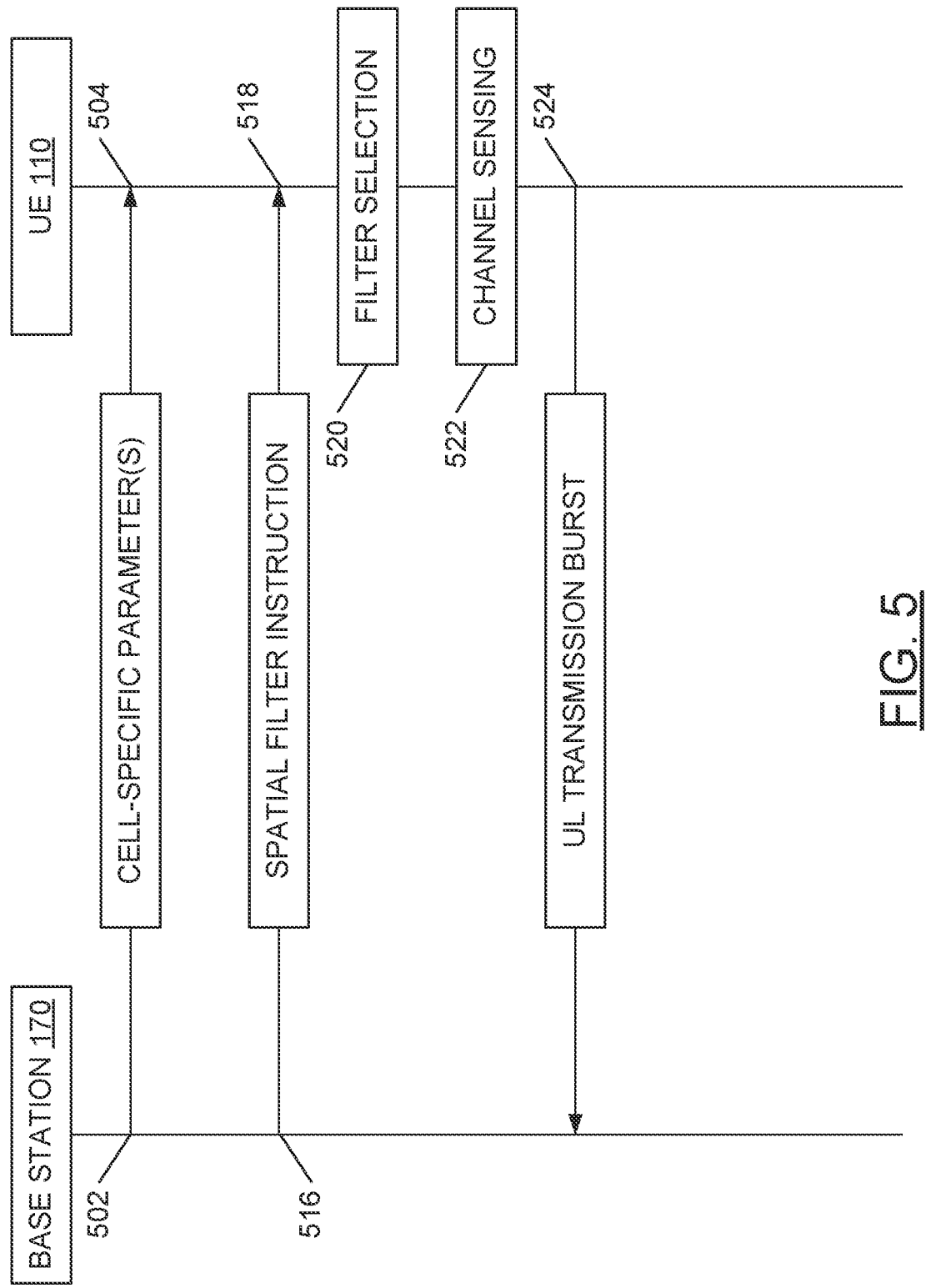
FIG. 5 illustrates, in a signal flow diagram for a first uplink scenario wherein the transmitter performs channel sensing, an exchange of signaling between the user equipment of FIG. 2 and the base station of FIG. 3 to inform the user equipment that channel sensing is to be performed at the transmitter, according to aspects of the present application.

FIG. 5 illustrates, in a signal flow diagram for the UL scenario, an exchange of signaling between the UE 110 and the BS 170 to inform the UE 110 that channel sensing is to be performed by the transmitter. The BS 170 may inform the UE 110 that the channel sensing is to be performed by the transmitter by transmitting (step 502), to the UE 110, an IE that includes one or more cell-specific parameters. The UE 110 receives (step 504) the IE and determines that a first parameter indicates that channel sensing is to be performed by the transmitter. The UE 110 performs (step 522) channel sensing in accordance with the first parameter. Responsive to sensing (step 522) the channel to be idle, the UE 110 may transmit (step 524) a UL transmission burst to initiate a CO. A UL transmission burst is defined, in Release 16, as a set of transmissions from the UE 110 without any gaps greater than 16 μs. For operation in a mmWave shared spectrum, a UL transmission burst may be defined as a set of transmissions from a UE without any gaps, or with gaps no greater than X μs (X μs may be 3 μs or 8 μs). In the latter case, transmissions from a UE 110 separated by a gap of more than X μs are considered as separate UL transmission bursts. A UE 110 may transmit transmission(s) after a gap within a UL transmission burst without sensing the corresponding channel(s) for availability.

In some aspects of the present application, the UE 110 may, in accordance with the received parameter, perform (step 522) directional channel sensing. The channel sensing is made directional by selecting and using a spatial filter. In some aspects of the present application, the spatial filter used for the sensing is the same spatial filter that is later used, by the UE 110, for the UL transmission.

To assist in selecting the spatial filter, the UE 110 may obtain spatial relation information. It is known that the UE 110 may obtain spatial relation information through the use of reference signals.

On the one hand, the UE 110 may transmit a plurality of reference signals. At the BS 170, the plurality of reference signals may be received and may be subject to measurement. Subsequent to the measurement, the BS 170 may transmit (step 516), to the UE 110, a spatial filter instructions in the form of an indication of a particular reference signal, among the plurality of reference signals, that was received with the greatest strength. The UE 110, upon receiving (step 518) the instruction from the BS 170, may select a spatial filter corresponding to the particular reference signal. The known sounding reference signal (SRS) may be considered a good candidate reference signal.

On the other hand, the UE 110 may receive a plurality of reference signals transmitted by the BS 170. Upon receiving the reference signals, the UE 110 may perform measurements and, on the basis of the measurements, select the best DL RS resource and select a particular spatial filter corresponding to a configuration that leads to a strong received reference signal. The UE 110 transmits a measurement report to the BS 170 indicating the best DL RS resource the UE 110 has selected. Upon selecting the particular spatial filter, the UE 110 may transmit, to the BS 170, using the particular spatial filter on multiple SRS resources. It is anticipated that the particular spatial filter will result in an UL signal being received, at the BS 170, with a greater strength than would be the case for UL signals subject to alternative spatial filters. The known SSB and the known channel state information reference signal (CSI-RS) may be considered good candidate DL reference signals. The BS 170 then performs measurements on the SRS resources and selects a particular SRS resource.

For subsequent UL transmissions, for instance PUCCH or SRS, the BS 170 may transmit/provide (step 516) to the UE 110 spatial relation information, e.g., through RRC signaling, indicating either a DL RS resource index or a UL RS resource index with which the UL transmission is associated. In some aspects, the BS 170 may send a plurality of IEs, with each of these IEs including spatial relation information to the UE 110. The UE 110 may receive the IEs and store the spatial filters in the UE memory 208. The BS 170 may subsequently activate/deactivate a particular spatial information IE by sending a designated MAC control element (CE) to the UE 110. Upon receiving the spatial relation information for a UL transmission, the UE 110 determines that the channel sensing to be performed before that UL transmission is directional. In some aspects of the present application, the UE 110 may select and use a spatial filter for the directional sensing that is the same spatial filter the UE 110 used to receive the DL RS indicated in the spatial relation information. In some other aspects of the present application, the UE 110 may select and use a spatial filter for the directional sensing that is the same spatial filter the UE 110 used to transmit the UL RS indicated in the spatial relation information.

It is known that the UE 110 may perform UL transmissions with timing selected on the basis of a UL scheduling grant received from the BS 170. An indication of a spatial filter may be indicated explicitly or implicitly in a parameter included with the UL scheduling grant. For example, the Transmit Precoder Matrix Indicator (TPMI) for Codebook-based PUSCH transmission, or the SRS Resource Indicator (SRI) for Non-codebook-based PUSCH transmission, respectively. It is known that the UL scheduling grant may be provided to the UE 110 either dynamically (in Downlink Control Information, "DCI," on PDCCH); or semi-statically over higher layer signaling, such as RRC signaling, or a combination of RRC signaling and an activation DCI. The UE 110 may select and use a spatial filter for the directional sensing that is the same spatial filter indicated in the UL scheduling grant for transmitting the UL transmissions. In some aspects, the UL scheduling grant includes an additional parameter explicitly or implicitly indicating a spatial sensing filter to be used by the UE 110 before transmitting the granted UL transmissions, if the cell-specific parameter has been provided and indicating that the channel sensing, to be performed by the transmitter, is directional.

Returning to the DL scenario (FIG. 4), in some aspects of the present application, the BS 170 may, in accordance with the received parameter, perform (step 416) directional channel sensing. The channel sensing is made directional by selecting and using a spatial filter. In some aspects of the present application, the spatial filter used for the sensing is reused, by the BS 170, for the DL transmission. One example case wherein such reuse may be appropriate is a special case wherein there is quasi co-location (QCL) relationship between a reference DL RS in one RS set (Transmission Configuration Indicator State) and an intended RS to be used, by the BS 170, for DL transmissions. The quasi co-location relationship may be provided (step 411, FIG. 4) to the UE 110 by the BS 170. The special case may occur, e.g., when the BS 170 performs DL transmissions over a physical downlink control channel ("PDCCH") or performs DL transmissions over a physical downlink shared channel ("PDSCH"), using, in both instances, demodulation reference signal ("DMRS") ports. The BS 170 may indicate to the UE 110 the TCI state it has used for the DL transmission in the scheduling DL assignment and thus the BS 170 may reuse the spatial filter associated with the indicated TCI state perform the directional channel sensing before transmitting the DL transmission.

In some aspects of the present application, the transmitter performs omni-directional channel sensing. As mentioned hereinbefore, the transmitter is the BS 170 for DL transmissions and the transmitter is the UE 110 for UL transmissions. In the UL scenario, in addition to instructing the UE 110 to perform channel sensing, the parameter received by the UE 110 may explicitly indicate the type of sensing that is to be performed. The parameter may indicate that an omni-directional channel sensing type is to be performed or the parameter may indicate that a directional channel sensing type. Alternatively, the UE 110 may be configured to interpret an instruction, in the parameter, to perform channel sensing in the absence of a further indication of a particular channel sensing type as implicitly instructing the UE 110 that an omni-directional channel sensing type is to be performed.

In preparation for the BS 170 DL transmissions (i.e., channel occupancy) in a variety of different directions, the BS 170 may perform channel sensing on the variety of channels that corresponds to the variety of directions using a spatial sensing filter that targets all of the different directions, e.g., a spatial sensing filter that forms a wide beam. This approach may be considered to represent a quasi-omni directional channel sensing. Rather than sensing the corresponding directions, the BS 170 may recognize that there is a QCL relationship between the variety of directions and a set of channels associated with, for example, PDSCH or PDCCH DMRS ports.

Notably, there may be cases wherein the spatial relation or the QCL relation are channel-sensing specific, i.e., the relations that are to be used for determining the spatial filter for channel sensing are separate from the relations that are used for determining the spatial transmit filter or spatial receive filter.

The UE 110 may measure multiple SSBs and select the best SSB. To initiate the channel access procedure, the UE 110 determines, using system information, a random access channel preamble (PRACH) resource associated with the best SSB. In some aspects, if the UE 110 selects a spatial filter for transmitting the PRACH (Msg1 of Type 1 random access procedure) or a spatial filter for transmitting a transmission including both PRACH and PUSCH (Msg A of Type 2 random access procedure), then the UE 110 may use the same spatial filter for channel sensing before transmitting UL transmissions related to the random access procedure, i.e., Msg1/Msg3 or Msg A. At the BS 170, upon receiving the PRACH, the BS 170 determines the best SSB selected by the UE 110 and use the same spatial transmit filter the BS 170 used for transmitting the best SSB to perform channel sensing before transmitting DL transmissions related to the random access procedure, i.e., Msg 2/Msg 4 or Msg B. In some other aspects, the UE 110 or the BS 170 determine the spatial sensing filter as if the cell-specific parameter indicates that the channel sensing type is directional; if the cell-specific parameter indicates otherwise, the UE 110 or BS 170 use omni-directional channel sensing before transmitting the transmissions related to the random access procedure.

In a second broad aspect of the present application, related to receiver-only channel sensing, it should be clear that the receiver is the UE 110 for DL transmissions and the receiver is the BS 170 for UL transmissions. According to this second broad aspect, the BS 170 may transmit, to the UE 110, the IE including a second parameter indicating that channel sensing is to be performed at the receiver.

It is often the case that a DL transmission, to the UE 110, is scheduled by the BS 170. Ahead of such a scheduled DL transmission, the BS 170 may transmit, to the UE 110, a DL scheduling assignment. Similarly, it is often the case that an UL transmission by the UE 110 is scheduled by the BS 170. Ahead of such a scheduled UL transmission, the BS 170 may transmit, to the UE 110, a UL scheduling grant.

Because the second broad aspect of the present application relates to channel sensing that is to be performed at the receiver, the BS 170 is expected to not perform channel sensing to access a channel, within the bandwidth of a serving cell for the UE 110, to transmit either a DL scheduling assignment or a UL scheduling grant. It is known that there are regions wherein LBT is mandated by a level of regulations, e.g., band 75 in International Telecommunications Union-Radiocommunication Sector (ITU-R) Region 1. However, even in these regions, the BS 170 is not expected to perform channel sensing because the DL scheduling assignment transmissions and UL scheduling grant transmissions are considered "Short Control Signaling" transmissions if transmitted independently outside of a CO initiated in accordance with a channel sensing procedure.

Figure 6:
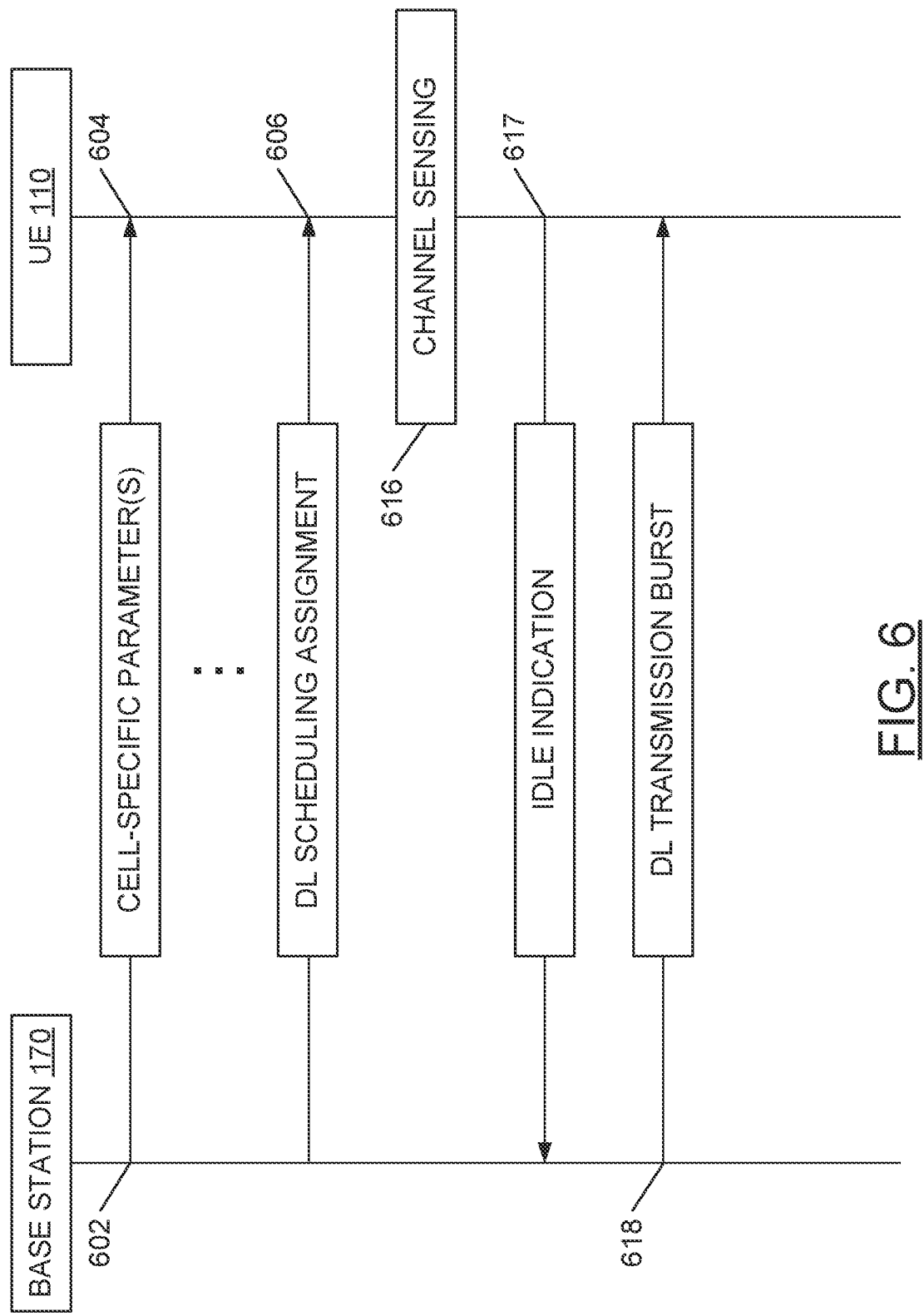
FIG. 6 illustrates, in a signal flow diagram for a downlink scenario wherein the receiver performs channel sensing, an exchange of signaling between the user equipment of FIG. 2 and the base station of FIG. 3 to inform the user equipment that channel sensing is to be performed at the receiver, according to aspects of the present application.

In view of FIG. 6, representative of a signal flow diagram for a DL scenario, only the intended receiver of a DL transmission, i.e., the UE 110, performs receiver channel sensing. According to aspects of the present application, the receiver channel sensing performed by the UE 110 is directional.

The UE 110 detects receipt (step 606) of a DL scheduling assignment. It should be understood that, well before the receipt (step 606) of the DL scheduling assignment, the UE 110 has received (step 604) an IE that has been transmitted (step 602) by the BS 170 and the UE 110 has determined that a first parameter, included in the IE, indicates that channel sensing is to be performed at the receiver.

The UE 110 may use a spatial filter to perform (step 616) the directional receiver channel sensing. In one instance, the spatial filter may be associated with PDSCH reception from the BS 170. In another instance, the spatial filter may be associated with PDCCH reception from the BS 170. In a further instance, the spatial filter may be associated with the direction from which the strongest reference signal (CSI-RS/SSB) has been received (not shown in FIG. 6) from the BS 170. In a further instance, the spatial filter is associated with PDCCH DMRS ports reception from the BS 170 as determined by the QCL relation indicated by the TCI state in the DCI carrying the DL scheduling assignment; each TCI state indicate the PDCCH is associated (QCLed) with CSI-RS, TRS or SSB. The association, of spatial filter to reception on a particular channel, may be in accordance with a QCL relationship provided, by the BS 170, to the UE 110 (not shown in FIG. 6). The BS 170 may also indicate, to the UE 110, a spatial filter in the DL scheduling assignment, received in step 602. For example, the BS 170 may indicate the spatial filter, to the UE 110, via a value in a dedicated SRS resource indicator (SRI) field in reference to the spatial filter the UE 110 has used to transmit the SRS indicated by the SRI field. In another example, the spatial sensing filter is the same spatial filter to be used by the UE 110 to transmit aperiodic SRS triggered by the SRS request field in the DL scheduling assignment.

Responsive to sensing (step 616) the channel to be idle for a sensing duration, the UE 110 transmits (step 617), to the BS 170, a short UL signal to indicate "idle channel." Alternatively, the UE 110 may employ a known PHY channel (e.g., the PUCCH) to transmit (step 617) an "idle channel" indication to the BS 170. The UE 110 may use an aperiodic SRS to transmit (step 617), to the BS 170, the short UL signal. Alternatively, the UE 110 may use the PUCCH to transmit (step 617), to the BS 170, the short UL signal. In either case, the transmission (step 617) of the short UL signal may be scheduled by the BS 170 in the DL scheduling assignment, received in step 606. Alternatively, the transmission of the short UL signal may be configured to start a pre-set number, N, of symbols before the beginning of the transmission (step 618) of a DL transmission burst, by the BS 170, to initiate a CO within the bandwidth of the serving cell for the UE 110. Notably, the latter alternative is valid when it is the task of the receiver to initiate CO and invalid when it is the task of the transmitter to initiate CO. One possible use case of the configuration of the set number, N, of symbols is when DL transmissions are semi-statically configured, such as the semi-persistent scheduling (SPS) of PDSCH.

In some aspects, the BS 170 may schedule multiple DL transmission bursts concurrently to multiple UEs 110, where the UEs 110 are spatially separated. In such a case, multiple idle channel indications may be required, i.e., each scheduled UE 110 may need to transmit, to the BS 170, an idle indication after sensing the channel to be idle. The BS 170 may trigger A-SRS individually from each scheduled UE 110, e.g., using the SRS Request field in the respective DL scheduling assignment, or trigger multiple A-SRS transmissions using a group common DCI, e.g., using DCI format 2_3 configured with the higher layer parameter "srs-TPC-PDCCH-Group" set to "typeB" or "typeA" and transmitted before. A UE 110 scheduled in such spatial multiplexing mode may not expect to receive the group common trigger DCI later than a number, M, of processing delay symbols before the beginning of the triggered A-SRS. In some aspects, as part of the procedure to decode the group common trigger DCI, a UE 110 that has been addressed by the DCI scrambling group common RNTI, but has not been scheduled in such spatial multiplexing mode, may ignore the SRS Request.

Figure 7:
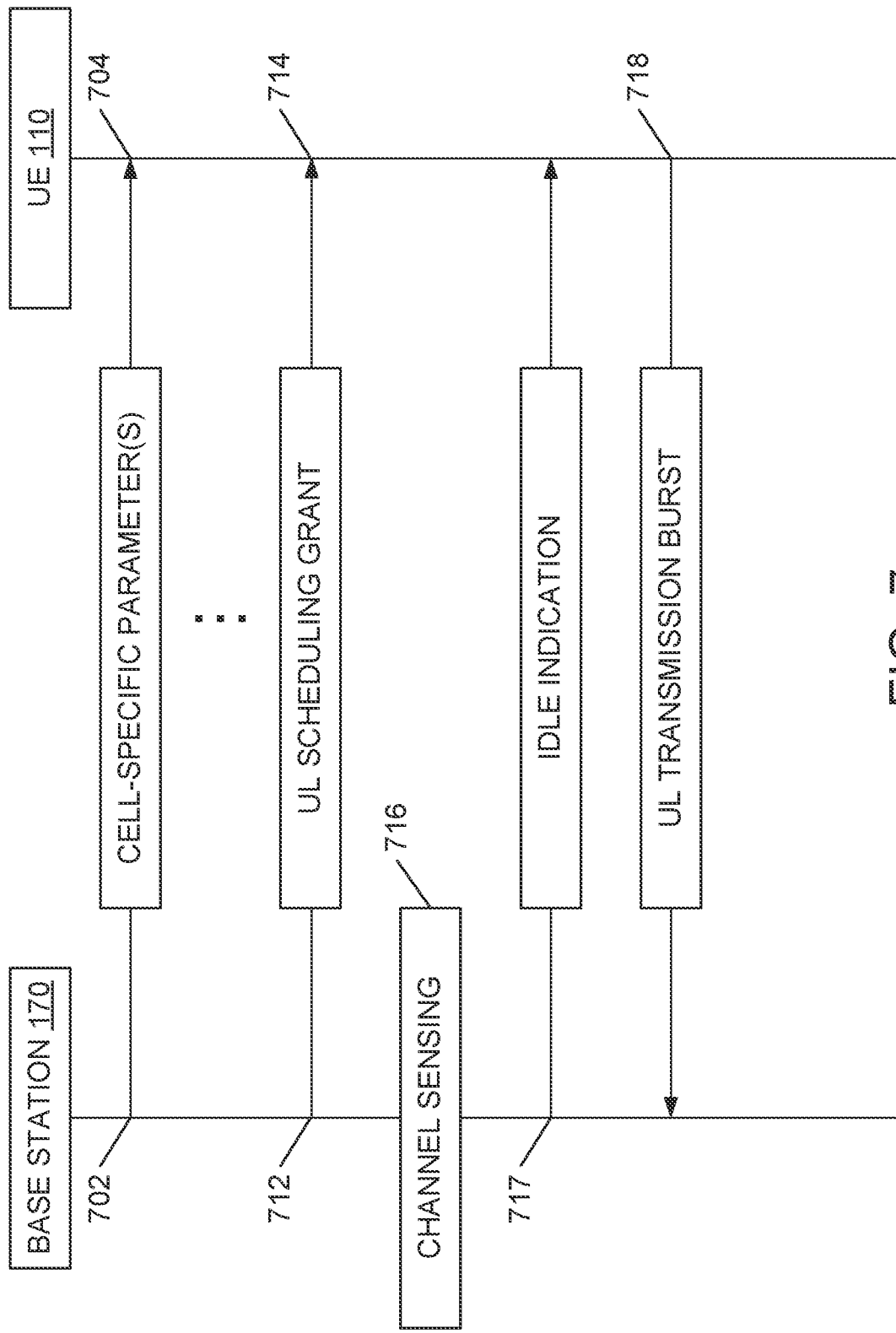
FIG. 7 illustrates, in a signal flow diagram for an uplink scenario wherein the receiver performs channel sensing, an exchange of signaling between the user equipment of FIG. 2 and the base station of FIG. 3 to inform the user equipment that channel sensing is to be performed at the receiver, according to aspects of the present application.

In a UL scenario, only the intended receiver of a UL transmission, i.e., the BS 170, performs receiver channel sensing. According to aspects of the present application, the receiver channel sensing performed by the BS 170 is directional. FIG. 7 is representative of a signal flow diagram for the UL scenario.

The UE 110 detects receipt (step 714) of a UL scheduling grant that has been transmitted (step 712) by the BS 170. It should be understood that, well before the receipt (step 714) of the UL scheduling grant, the UE 110 has received (step 704) an IE that has been transmitted (step 702) by the BS 170 and the UE 110 has determined that a first parameter, included in the IE, indicates that channel sensing is to be performed at the receiver.

The BS 170 may use a spatial filter to perform (step 716) the directional receiver channel sensing. In one instance, the spatial filter may be associated with PUSCH reception from the UE 110; for example the BS 170 may use the same spatial filter that was used, by the BS 170, to transmit the CSI-RS or the SSB associated with the SRS resource index indicted by the SRI field in the UL scheduling grant; or the BS 170 may use the same spatial receive filter associated with the TPMI indicated in the UL scheduling grant. In another instance, the spatial filter may be associated with PUCCH reception from the UE 110. In a further instance, the spatial filter may be associated with the direction from which the strongest reference signal (SRS) has been received from the UE 110 (not shown in FIG. 7). The association, of the spatial filter to particular UL channel/signal reception, may be in accordance with a spatial relation information provided, by the BS 170, to the UE 110. The association, of the spatial filter to particular UL channel reception, may further be in accordance with the most recently designated MAC-CE sent, to the UE 100, by the BS 170.

Responsive to sensing (step 716) the channel to be idle for the sensing duration, the BS 170 transmits (step 717), to the UE 110, a short DL signal to indicate "idle channel." Alternatively, the BS 170 may employ a PHY channel (e.g., the PDCCH) to indicate "idle channel" to the UE 110. The BS 170 may use an aperiodic non-zero power (NZP) CSI-RS resource to transmit (step 717), to the UE 110, the short DL signal. Alternatively, the BS 170 may use the scheduling PDCCH to transmit (step 717), to the UE 110, the short DL signal. In any case, the transmission (step 717) of the short DL signal may be scheduled or triggered by the BS 170 in the UL scheduling grant. In some aspects, if the UE 110 is configured with aperiodic SRS associated with aperiodic NZP CSI-RS resource, the presence of the associated CSI-RS is indicated by the SRS request field if the value of the SRS request field is not "00"; the CSI-RS would be located in the same slot as the SRS request field. Alternatively, the transmission of the short DL signal may be configured to start a pre-set number, N, of symbols before the beginning of the transmission (step 718) of a UL transmission burst, by the UE 110, to initiate a CO within the bandwidth of the serving cell for the UE 110. One possible use case of the configuration of the N symbols is when UL transmissions are semi-statically configured, such as PUSCH transmission with configured grant (CG) or transmission of periodic PUCCH.

The second parameter, included in the IE, may further provide an indication that the receiver is empowered to initiate the CO. Such receiver-initiated CO is configured instead of typical transmitter-initiated CO. Upon initiating the CO, the receiver may share the initiated channel occupancy with the transmitter. The inclusion, in the second parameter, of the indication that the receiver is empowered to initiate the CO may be found to be useful in those cases wherein the serving cell is configured in a band in a region wherein LBT is mandated by a level of regulations, e.g., band 75 in ITU-R Region 1.

When channel sensing is performed, it may be considered that the entity (e.g., the UE 110 or the BS 170) that is performing (step 616 in FIG. 6, step 716 in FIG. 7) the sensing senses a given channel over a plurality of time slots, hereinafter called "sensing slots." The duration of the sensing may, accordingly, be expressed as a number of time slots.

Aspects of the present application relate to using a random duration for the sensing. Because the duration of time slots is pre-configured, the random duration may be implemented as a random number of time slots.

In one example, channel sensing may be performed in accordance with a so-called Type 1 UL/DL channel access procedure. In the following, the value p is representative of a single channel access priority class (CAPC) value associated with a DL/UL transmission that shares the CO initiated by the receiver. A deferral period for the channel sensing may be defined as $T_d = T_f + m_p * T_{sl}$, where $T_f$ is representative of a fixed duration, $m_p$ is representative of a number of consecutive sensing slots that follow the fixed duration and $T_{sl}$ is representative of a duration of a sensing slot. Notably, the integer number of consecutive sensing slots, $m_p$, is associated with the CAPC value, p, associated with the DL/UL transmission. The channel sensing may be performed over a random number, N, of consecutive time slots. Generation of the random number, N, may involve selecting the number from the interval $[0, CW_p]$, where $CW_p$ is representative of a size (in time slots) of a contention window associated with the CAPC value, p. The value of the contention window size, $CW_p$, may not be less than three time slots and, otherwise, may range between a minimum, $CW_{min,p}$, and a maximum, $CW_{max,p}$, configured for the CAPC value, p. That is, $\max\{3, CW_{min,p}\} \leq CW_p \leq CW_{max,p}$. In one example, $T_f = 3$ μs, $T_{sl} = 5$ μs and $m_p \geq 1$.

The max EDT used by the receiver may be set to the minimum of a max $EDT_{Rx}$ calculated based on the "idle indication" transmission parameters associated with the receiver and a max $EDT_{Tx}$ calculated based on transmission parameters associated with the transmitter. The transmission parameters associated with the transmitter may include one or more of output power, $P_{out}$, total transmission power, transmitter antenna gain, the beamforming gain and the transmission bandwidth of the potential following transmission.

When the receiver is the UE 110, the transmission parameters or a max EDT associated with the BS 170 may be provided, by the BS 170, to the UE 110 via higher layer signaling.

It is expected that the duration of transmissions by the transmitter will not exceed a maximum channel occupancy time (MCOT), $T_{mcot,p}$, from the beginning of the channel occupancy time (COT) initiated by the receiver.

In aspects of the present application, the duration of any transmission gap may be counted in the COT. Alternatively, only a transmission gap duration that is less than or equal to a specific duration (e.g., 8 μs) may be counted in the COT. If multiple CAPC values are not defined, a common MCOT value may be used, e.g., $T_{mcot,p} = 5$ ms.

In the case wherein the receiver does not initiate the CO, the sensing time duration, that is, number of time slots used for sensing, may be deterministic or random. The contention window may be set to the known minimum (three sensing slots) or the contention window may be set to a minimum value, $CW_{min,p}$, associated with the CAPC value, p, if the CAPC value, p, is defined.

Still in the case wherein the receiver does not initiate the CO, the intended receiver, i.e., either the UE 110 that has detected receipt (step 606, FIG. 6) of a DL scheduling assignment or the BS 170 that has transmitted (step 714, FIG. 7) of a UL scheduling grant, performs (step 616, step 716) directional receiver channel sensing before the transmitter accesses the channel within the bandwidth of the serving cell of the UE 110 to transmit (step 618, step 718) a burst to initiate the CO.

When the UE 110 is the intended receiver, the UE 110 may use a spatial filter associated with PDSCH reception from the BS 170. Alternatively, the UE 110 may use a spatial filter associated with PDCCH reception. Further alternatively, the UE 110 may use a spatial filter associated with an optimum CSI-RS/SSB receive direction from the BS 170.

The BS 170 may also indicate a spatial filter, to the UE 110, in the DL scheduling assignment, e.g., via a value in a dedicated SRI field.

When the BS 170 is the intended receiver, the BS 170 may use a spatial filter associated with PUSCH reception from the UE 110. Alternatively, the BS 170 may use a spatial filter associated with PUCCH reception. Further alternatively, the BS 170 may use a spatial filter associated with an optimum SRS receive direction from the UE 110.

Even though a decision regarding whether a channel is busy or idle is a binary decision, the conditions detected may be other than binary, that is, receiver channel sensing may be defined as determining a level of interference. In cases wherein the interference originates from a node that is hidden from the perspective of the transmitter, receiver channel sensing may be of particular importance. The receiver may interpret a particular level of interference, that is, a level of interference that exceeds a threshold, to be harmful to the reception of a future transmission. Upon determining that a detected level of interference exceeds the threshold, the receiver may consider that the channel is busy. Indeed, the receiver need not use an EDT formula set by regulations from a transmitter channel sensing perspective, e.g., a function of the transmitter output power only, without regard for the location of the receiver within the coverage area and with respect to interferers.

To determine whether a harmful interference level exists, the receiver may measure an interference level and compare the measured interference level to a receiver maximum energy detection threshold ($EDT_{Rx}$). The $EDT_{Rx}$ may be determined using a formula that is different from a formula used to determine transmitter maximum energy detection threshold.

When the UE 110 is the receiver, a value for the $EDT_{Rx}$ may be determined by adding a configurable offset in dB, e.g., signal-to-interference-plus-noise ratio (SINR) offset, to a reference signal received power (RSRP) threshold, i.e., $$EDT_{Rx} = -71 \ dBm + 10\log_{10}\frac{BW}{2 \ GHz} + \mathit{offset}_{dB}.$$

The significance of the RSRP threshold as reference level is that it represents the minimum level of received power the UE 110 would accept to be associated with a serving BS 170.

When the BS 170 is the receiver, a value for the $EDT_{Rx}$ may be determined based on at least the target received power per resource block (RB), $P_0(j)$. This value may be found among open-loop UL power control (PC) parameters provided, by the BS 170, to the UE 110. For $P_0(j)$, j corresponds to value in the SRI field included in the UL scheduling grant and j=1 for configured grant PUSCH.

The actual number of allocated radio blocks in the UL scheduling grant may be used to scale up $P_0(j)$ by the bandwidth for a given subcarrier spacing (SCS) or the maximum number of RBs that can be allocated within the active bandwidth part (BWP). In one example, the maximum number of allocated radio blocks in the UL scheduling grant is 275 radio blocks per component carrier.

Aspects of the present application related to channel sensing that is to be performed at the receiver may be shown to reduce LBT overhead relative to some known receiver-assisted LBT mechanisms. Operation using the LBT channel access mechanism at the receiver may be shown to increase spatial reuse, in a manner similar to operation without using LBT, while mitigating a known issue, the so-called "hidden node" issue sometimes found in channel access mechanism that eschew using LBT. The proposed LBT channel access mechanism performed at the receiver may be shown to relax switching time between a time of receipt of an idle indication from an intended receiver and a time of transmission in those instances wherein the intended receiver is configured to initiate channel occupancy. This due to the fact the current ETSI BRAN regulations (see EN 302 567 and EN 302 722) do not specify a maximum duration of a DL-to-UL or UL-to-DL switching gap within an initiated CO. The proposed LBT channel access mechanism performed at the receiver may be further shown to allow for configuration of a performance-centric energy detection threshold for receiver channel sensing when the intended receiver is not initiating channel occupancy.

A third broad aspect of the present application relates to channel sensing configured to occur at the transmitter and at the receiver. According to this third broad aspect, the BS 170 may transmit, to the UE 110 in an IE, a first parameter indicating that transmitter channel sensing is to be performed. The BS 170 may also transmit, to the UE 110 in the same IE or a further IE, a second parameter indicating that receiver channel sensing is to be performed.

Inside an existing CO, the BS 170 shall not perform channel sensing before transmitting a DL scheduling assignment or a UL scheduling grant.

Outside of an existing CO, the BS 170 may initiate a CO by transmitting a short DL burst. This does not include unicast user plane data but does include DL scheduling assignment transmissions and UL scheduling grant transmissions. Subsequent to the initiation of the CO, at least one transmission in the initiated CO may be carried out by the BS 170.

A transmission from the BS 170 may be considered "Short Control Signaling" and, accordingly, the transmission does not require channel sensing that would, otherwise, be required by regulations.

In cases wherein the BS 170 is to initiate a transmission that is not considered "Short Control Signaling," the BS 170 performs (step 416, FIG. 4) channel sensing to access a channel within the bandwidth of the serving cell of the UE 110. Upon sensing the channel to be idle, the BS 170 transmits (step 418) a short DL burst. The channel sensing type (directional/omni-directional) may be determined based on the first parameter. The short DL burst may be limited to a maximum duration, e.g., $2*2^\mu$ symbols where $\mu$ is the SCS used for transmitting the short DL burst The time duration spanned by sensing slots that are sensed to be idle before the short DL burst may be deterministic, e.g., 8 µs in accordance with a so-called Type 2 DL channel access procedure. Alternatively, the time duration spanned by sensing slots that are sensed to be idle before the short DL burst may be random, e.g., channel sensing may be performed in accordance with the known Type 1 DL channel access procedure, with the minimum CWS (three sensing slots) and/or corresponding to the minimum CAPC value, p.

Figure 8:
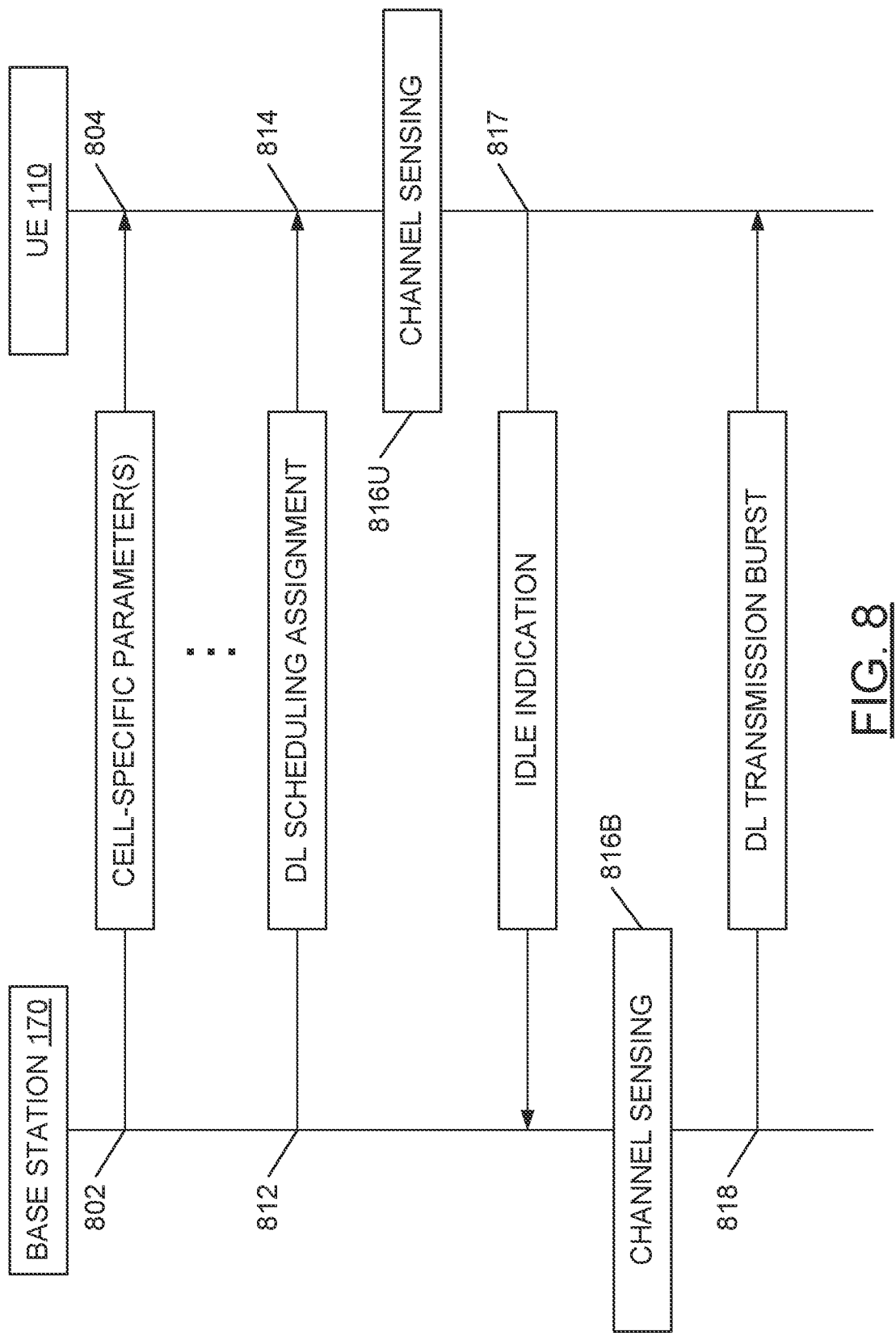
FIG. 8 illustrates, in a signal flow diagram for a downlink scenario wherein both the transmitter and the receiver perform channel sensing, an exchange of signaling between the user equipment of FIG. 2 and the base station of FIG. 3 to inform the user equipment that channel sensing is to be performed at the transmitter and at the receiver, according to aspects of the present application.

When the intended receiver is the UE 110, the scenario is a DL scenario, a signal flow diagram for which scenario is illustrated in FIG. 8.

The UE 110 detects receipt (step 814) of a DL scheduling assignment that has been transmitted (step 812) by the BS 170. It should be understood that, well before the receipt (step 814) of the DL scheduling assignment, the UE 110 has received (step 804) an IE that has been transmitted (step 802) by the BS 170 and the UE 110 has determined that a first parameter, included in the IE, indicates that channel sensing is to be performed at the transmitter and that a second parameter, included in the same IE or a distinct IE, indicates that channel sensing is to be performed at the receiver.

The UE 110 may use a spatial filter to perform (916U) the directional receiver channel sensing. In one instance, the spatial filter may be associated with PDSCH reception from the BS 170. In another instance, the spatial filter may be associated with PDCCH reception from the BS 170. In a further instance, the spatial filter may be associated with the direction from which the strongest reference signal (CSI-RS/SSB) has been received from the BS 170. In a further instance, the spatial filter is associated with PDCCH DMRS ports reception from the BS 170 as determined by the QCL relation indicated by the TCI state in the DCI carrying the DL scheduling assignment; each TCI state indicate the PDCCH is associated (QCLed) with CSI-RS, TRS or SSB. The association, of spatial filter to reception on a particular channel, may be in accordance with a QCL relationship provided, by the BS 170, to the UE 110 (not shown in FIG. 8).

The BS 170 may also indicate, to the UE 110, a spatial filter in the DL scheduling assignment transmitted in step 812. For example, the BS 170 may indicate the spatial filter, to the UE 110, via a value in a dedicated SRI field in reference to the spatial filter the UE 110 has used to transmit the SRS indicated by the SRI field. In another example, the spatial sensing filter is the same spatial filter to be used by the UE 110 to transmit aperiodic SRS triggered by the SRS request field in the DL scheduling assignment.

Responsive to sensing (step 816U) the channel to be idle for the sensing duration, the UE 110 transmits (step 817), to the BS 170, a short UL signal to indicate "idle channel." Alternatively, the UE 110 may employ a known PHY channel (e.g., the PUCCH) to indicate "idle channel" to the BS 170. The UE 110 may use an aperiodic SRS to transmit, to the BS 170, the short UL signal. Alternatively, the UE 110 may use the PUCCH to transmit, to the BS 170, the short UL signal. In either case, the transmission of the short UL signal may be scheduled by the BS 170 in the DL scheduling assignment. Alternatively, the transmission (step 817) of the short UL signal may configured to start a pre-set number, N, of symbols before the beginning of the transmission (step 818) of a DL transmission burst, by the BS 170, to initiate a CO within the bandwidth of the serving cell for the UE 110. Notably, the latter alternative is valid when it is the task of the receiver to initiate CO and invalid when it is the task of the transmitted to initiate CO. One possible use case of the configuration of the set number, N, of symbols is when DL transmissions are semi-statically configured, such as the semi-persistent scheduling (SPS) of PDSCH.

In some aspects, the BS 170 may schedule multiple DL transmission bursts concurrently to multiple UEs 110, where the UEs 110 are spatially separated. In such a case, multiple idle channel indications may be required, i.e., each scheduled UE 110 may need to transmit, to the BS 170, an idle channel indication after sensing the channel to be idle. The BS 170 may trigger A-SRS individually from each scheduled UE 110, e.g., using the SRS Request field in the respective DL scheduling assignment, or trigger multiple A-SRS transmissions using a group common DCI, e.g., using DCI format 2_3 configured with the higher layer parameter "srs-TPC-PDCCH-Group" set to "typeB" or "typeA" and transmitted before. A UE 110 scheduled in such spatial multiplexing mode may not expect to receive the group common trigger DCI later than a number, M, of processing delay symbols before the beginning of the triggered A-SRS. In some aspects, as part of the procedure to decode the group common trigger DCI, a UE 110 that has been addressed by the DCI scrambling group common RNTI, but has not been scheduled in such spatial multiplexing mode, may ignore the SRS Request.

The BS 170 detects receipt of the "idle indication" transmitted (step 817) by the UE 110. The BS 170 then performs (step 816B) channel sensing on a channel within the bandwidth of the serving cell of the UE 110. Responsive to sensing (step 816B) the channel to be idle, the BS 170 may transmit (step 818) a DL transmission burst to initiate a CO. The channel sensing type (directional/omni-directional) may be determined based on the first parameter.

Figure 9:
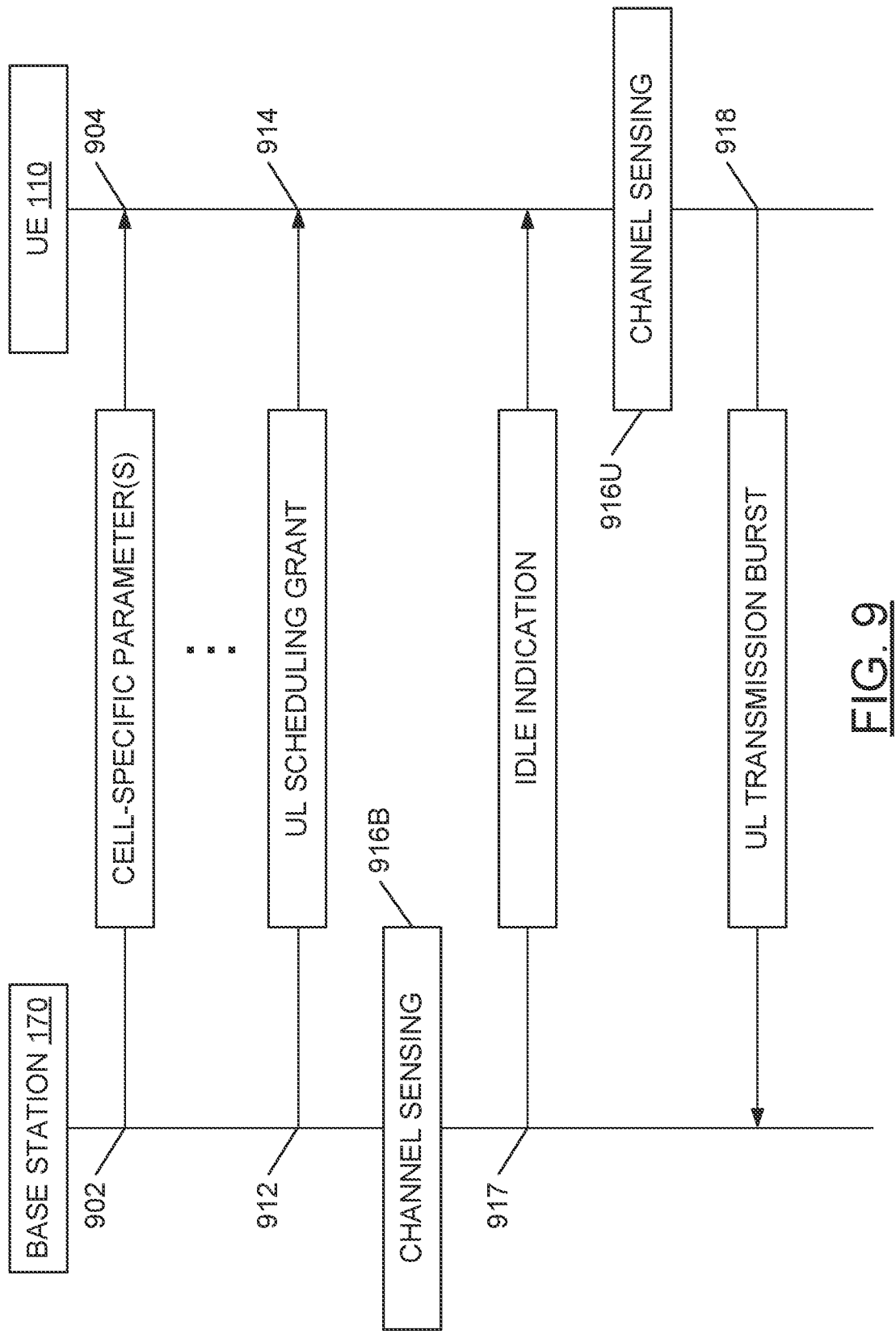
FIG. 9 illustrates, in a signal flow diagram for an uplink scenario wherein both the transmitter and the receiver perform channel sensing, an exchange of signaling between the user equipment of FIG. 2 and the base station of FIG. 3 to inform the user equipment that channel sensing is to be performed at the transmitter and at the receiver, according to aspects of the present application.

When the intended receiver is the BS 170, the scenario is a UL scenario, a signal flow diagram for which scenario is illustrated in FIG. 9.

The UE 110 detects receipt (step 914) of a UL scheduling grant that has been transmitted (step 912) by the BS 170. It should be understood that, well before the receipt (step 914) of the UL scheduling grant, the UE 110 has received (step 904) an IE that has been transmitted (step 902) by the BS 170 and the UE has determined that a first parameter, included in the IE, indicates that channel sensing is to be performed at the transmitter and that a second parameter, included in the same IE or a distinct IE, indicates that channel sensing is to be performed at the receiver.

The BS 170 may use a spatial filter to perform (step 916B) the directional receiver channel sensing. In one instance, the spatial filter may be associated with PUSCH reception from the UE 110; for example the BS 170 may use the same spatial filter that was used, by the BS 170, to transmit the CSI-RS or the SSB associated with the SRS resource index indicted by the SRI field in the UL scheduling grant; or the BS 170 may use the same spatial receive filter associated with the TPMI indicated in the UL scheduling grant. In a further instance, the spatial filter may be associated with the direction from which the strongest SRS has been received from the UE 110. The association, of the spatial filter to particular UL channel/signal reception, may be in accordance with a spatial relation information provided, by the BS 170, to the UE 110. The association, of the spatial filter to particular UL channel reception, may further be in accordance with the most recently designated MAC-CE sent, to the UE 110, by the BS 170.

Responsive to sensing (step 916B) the channel to be idle for the sensing duration, the BS 170 transmits (step 917), to the UE 110, a short DL signal to indicate "idle channel." Alternatively, the BS 170 may employ the known PHY channel (e.g., the PDCCH) to indicate "idle channel" to the UE 110. The BS 170 may use an aperiodic NZP CSI-RS to transmit (step 917), to the UE 110, the short DL signal. Alternatively, the BS 170 may use the scheduling PDCCH to transmit (step 917), to the UE 110, the short DL signal. In any case, the transmission (step 917) of the short DL signal may be scheduled or triggered by the BS 170 in the UL scheduling grant transmitted in step 901. In some aspects, if the UE 110 is configured with aperiodic SRS associated with aperiodic NZP CSI-RS resource, the presence of the associated CSI-RS is indicated by the SRS request field if the value of the SRS request field is not "00"; the CSI-RS would be located in the same slot as the SRS request field. Alternatively, the transmission (step 917) of the short DL signal may be configured to start a pre-set number, N, of symbols before the beginning of the transmission (step 918) of a UL transmission burst, by the UE 110, to initiate a CO within the bandwidth of the serving cell for the UE 110. One possible use case of the configuration of the N symbols is when UL transmissions are semi-statically configured, such as PUSCH transmission with configured grant (CG) or transmission of periodic PUCCH.

In a UL scenario, the UE 110 detects receipt of an "idle indication" transmitted (step 917) from the BS 170. The UE 110 then performs (step 916U) channel sensing on a channel within the bandwidth of the serving cell of the UE 110. Responsive to sensing (step 916U) the channel to be idle, the UE 110 may transmit (step 918) a UL transmission burst to initiate a CO. The channel sensing type (directional/omnidirectional) may be determined based on the first parameter.

The time duration spanned by the sensing slots may be deterministic or may be random (recall the Type 1 UL/DL channel access procedure, discussed hereinbefore). The random duration for sensing may be particularly useful for high priority access, as explained hereinbefore in the case wherein the receiver is not initiating the CO instead of the transmitter.

Rather than simply detecting a binary condition, that is, whether a channel is busy or idle, receiver channel sensing may be defined as determining a level of interference. In cases wherein the interference originates from a node that is hidden from the perspective of the transmitter, receiver channel sensing may be of particular importance. The receiver may interpret a particular level of interference, that is, a level of interference that exceeds a threshold, to be harmful to the reception of a future transmission. Upon determining that a detected level of interference exceeds the threshold, the receiver may consider that the channel is busy.

To determine whether a harmful interference level exists, the receiver may measure an interference level and compare the measured interference level to an $EDT_{Rx}$. The $EDT_{Rx}$ may be determined using a formula that is different from a formula used to determine transmitter maximum energy detection threshold.

When the UE 110 is the receiver, a value for the $EDT_{Rx}$ may be determined by adding a configurable SINR offset to a RSRP threshold, i.e., $$EDT_{Rx} = -71 \ dBm + 10\log_{10}\frac{BW}{2 \ \text{GHz}} + \textit{offset}_{dB}.$$

When the BS 170 is the receiver, a value for the $EDT_{Rx}$ may be determined based on at least the target received power per radio block, $P_0(j)$. This value may be found among open-loop UL PC parameters provided, by the BS 170, to the UE 110. For $P_0(j)$, j corresponds to value in the SRI field included in the UL scheduling grant and j=1 for configured grant PUSCH.

The actual number of allocated radio blocks in the UL scheduling grant may be used to scale up $P_0(j)$ by the bandwidth for a given SCS or the maximum number of radio blocks that can be allocated within the active BWP. In one example, the maximum number of allocated radio blocks in the UL scheduling grant is 275 radio blocks per component carrier.

In one example, channel sensing may be performed in accordance with a the Type 1 UL/DL channel access procedure. Recall that the value p is representative of a single CAPC value associated with a DL/UL transmission that shares the CO initiated by the receiver. A deferral period for the channel sensing may be defined as $T_d = T_f + m_p * T_{sl}$. Notably, the integer number of consecutive sensing slots, $m_p$, is associated with the CAPC value, p, associated with the DL/UL transmission. The channel sensing may be performed over a random number, N, of consecutive time slots. Generation of the random number, N, may involve selecting the number from the interval [0, $CW_p$], where $CW_p$ is representative of a size (in time slots) of a contention window associated with the CAPC value, p. The value of the contention window size, $CW_p$, may not be less than three time slots and, otherwise, may range between a minimum, $CW_{min,p}$, and a maximum, $CW_{max,p}$, configured for the CAPC value, p. That is, $\max\{3, CW_{min,p}\} \leq CW_p \leq CW_{max,p}$. In one example, $T_f = 3$ µs, $T_{sl} = 5$ µs and $m_p \geq 1$.

The max EDT used by the receiver may be set based on the "idle indication" transmission parameters and a max $EDT_{Tx}$ calculated based on transmission parameters associated with the transmitter. The transmission parameters associated with the transmitter may include one or more of output power, $P_{out}$, total transmission power, transmitter antenna gain and transmitter bandwidth.

$$EDT_{Rx} = -47 \ dBm + 10\log_{10}\frac{P_{max}}{P_{out}} + 10\log_{10}\frac{BW}{2 \ \text{GHz}},$$

wherein $P_{out}$ is the RF output power (effective isotropic radiated power, "EIRP") and $P_{max}$ is the RF output power limit (EIRP).

It is expected that the duration of transmissions by the transmitter will not exceed an MCOT, $T_{mcot,p}$, from the beginning of the COT initiated by the receiver.

In aspects of the present application, the duration of any transmission gap may be counted in the COT. Alternatively, only a transmission gap duration that is less than or equal to a specific duration (e.g., 8 µs) may be counted in the COT. If multiple CAPC values are not defined, a common MCOT value may be used, e.g., $T_{mcot,p} = 5$ ms.

In the second broad aspect of the present application, it is only the receiver that performs channel sensing. In the third broad aspect of the present application both the receiver and the transmitter may perform channel sensing.

These two aspects have in common scenarios wherein an intended receiver is configured to perform channel sensing. The configuration may be done through a dynamic indication. The performance of the channel sensing occurs before transmission of an "idle channel" indication, which occurs upon sensing the channel to be idle. Recall that the sensing is carried out for a sensing duration and that the sensing duration may be deterministic or may be random.

In the following, the focus is on the DL scenario, wherein the UE 110 is the intended receiver and the BS 170 is the transmitter. In particular, the focus in the following is on the case in which the UE 110 uses an aperiodic SRS (A-SRS) triggered by the BS 170 in the DL assignment DCI that is used for scheduling one or more subsequent PDSCH(s), to transmit, to the BS 170, the "idle channel" indication as receiver-assistance information. In such a case, it should be understood that existing mechanisms in 3GPP Rel-15/16 enable triggering A-SRS on pre-configured SRS resources by non-fallback DCI formats (i.e., DCI 1_1 and DCI 1_2 in the DL scheduling scenario). Notably, the existing mechanisms are established for purposes distinct from "idle channel" indication. Such purposes may include supporting a MIMO feature or "usage" (i.e., beam management, codebook based transmissions, non-codebook based transmissions or antenna switching), or supporting positioning features.

According the UE sounding procedure in TS 38.214 v16.6.0, the UE 110 may be configured with one or more SRS resource sets, as configured by the higher layer parameter SRS-ResourceSet or SRS-PosResourceSet (in case of positioning). For each SRS resource set configured by SRS-ResourceSet, a UE 110 may be configured with SRS resources (higher layer parameter SRS-Resource), where the maximum value of K is indicated by a UE capability. When the SRS resource set is configured with the higher layer parameter SRS-PosResourceSet, a UE 110 may be configured with K≥1 SRS resources (higher layer parameter SRS-PosResource), where the maximum value of K is 16. The SRS resource set applicability, or MIMO usage as explained hereinbefore, may be configured by the higher layer parameter, usage, in SRS-ResourceSet. For A-SRS, at least one state of the DCI field (SRS request) may be used to select at least one SRS resource set among the configured SRS resource set(s).

As such, the BS 170 typically triggers the transmission of all SRS resource sets configured by SRS-ResourceSet with the value of the higher layer parameter aperiodicSRS-ResourceTrigger or with the value of an entry in the higher layer parameter aperiodicSRS-ResourceTriggerList set to the value of the SRS request field in the triggering DCI format. Also, the BS 170 typically triggers the transmission of all SRS resource sets configured by SRS-PosResourceSet with the value of an entry in the higher layer parameter aperiodicSRS-ResourceTriggerList set to the value of the SRS request field in the triggering DCI format. No SRS resource set is triggered if the value of the SRS request field is 0, e.g., the designated 2 bits of that field indicate 00.

It follows that, for operation with shared spectrum access in the frequency range FR2-2 (the 60 GHz unlicensed spectrum within the extended FR2 from 52.6 GHz to 71 GHz) or above, a method is needed to leverage the existing A-SRS triggering mechanism for the distinct purpose of transmitting the binary idle indication as receiver assistance information. To establish appropriate conditions for the triggering mechanism, channel sensing by the receiver (steps 616 and 816U) is carried out. Additionally, the triggering of a single A-SRS resource (steps 617 and 817), rather than, potentially, multiple SRS resource sets, is conditional upon sensing the channel to be idle. Moreover, a UE 110 that supports receiver-assisted channel access should also be able to operate in accordance with a legacy A-SRS triggering mechanism to support the A-SRS-based MIMO/Positioning features for backward compatibility.

It should be noted, also, that in existing configuration of aperiodic SRS resource sets, the location of the aperiodic SRS resource(s) in time domain may be provided by the higher layer parameter slotOffset, which is an offset in number of slots between the triggering DCI and the actual transmission of the SRS-ResourceSet with a default value of 0 if not provided.

The location of the aperiodic SRS resource(s) in time domain may also be provided by the higher layer parameter startPosition, provided for each aperiodic SRS resource, which indicates the first symbol of the resource, found by counting backwards from the last symbol of the slot indicated by slotOffset. For an aperiodic SRS-ResourceSet, the slotOffset is defined for the SRS resource set but, for an aperiodic SRS-PosResourceSet, the slotOffset is defined for each aperiodic SRS resource. Given that triggering A-SRS transmission for providing receiver assistance information is intended for reporting the interference condition to the transmitter BS 170 at the intended receiver UE 110, transmitting the A-SRS as an idle indication should be as close as possible, in time domain, to the start of the scheduled PDSCH(s) for the reporting to be relevant, e.g., the UE 110 expects that the triggered A-SRS transmission should start, at most, N symbols before the start of the scheduled PDSCH(s). The number of symbols, N, may be determined based on one or more of the subcarrier spacing of the active BWP, the subcarrier spacing of the scheduling PDCCH, the UE capability and the UE mobility/channel model. The minimum number of symbols from the start of the A-SRS transmission to the start of the scheduled PDSCH(s) (<N) may also be determined based on one or more of the subcarrier spacing of the active BWP, the UE capability on the time requirements to switch from transmitting to receiving using a same or different spatial domain filter, and the BS's processing time of A-SRS. Therefore, in the following, it may be specified that the higher layer parameter slotOffset for an aperiodic SRS resource (set) that is triggered for the purpose of providing receiver assistance in channel access may be reinterpreted to indicate the number of slots from the actual transmission of the triggered aperiodic SRS resource (set) to the start of the scheduled PDSCH(s). If the parameter slotOffset is set to 0, or if the parameter is not provided, it would mean that the aperiodic SRS resource(s), if triggered, occurs in leading symbols in the same slot in which the scheduled PDSCH (or the first PDSCH of multiple scheduled PDSCHs by the triggering DCI) starts. If the parameter slotOffset is set to 1, it would mean that the aperiodic SRS resource(s), if triggered, occurs in the slot preceding the slot in which the scheduled PDSCH (or the first PDSCH of multiple scheduled PDSCHs by the triggering DCI) starts. For example, a new higher layer parameter, startPosition-r17, with the value range (0 . . . 13), may be provided for that aperiodic SRS resource, instead of the legacy parameter, startPosition, with the value range (0 . . . 5), for increased flexibility in the aperiodic SRS resource mapping.

In aspects of the present application, it is proposed to introduce a 1-bit flag in the non-fallback DL assignment DCI, e.g., DCI format 1_1 with CRC scrambled by C-RNTI, CS-RNTI or MCS-C-RNTI and use the existing SRS request field.

For operation with shared spectrum access in FR2-2, a 1-bit flag, e.g., "Channel access SRS" or "Channel access indication," is added in the non-fallback DL assignment DCI format to be used for scheduling PDSCH(s) and triggering A-SRS as an "idle indication" in the serving cell for the purpose of receiver-assisted channel access before the start of the scheduled PDSCH(s).

If the 1-bit flag is present in the DCI format and is set to 1, this indicates to the intended receiver UE 110, upon decoding the DCI format, that the SRS request field in the same DCI triggers A-SRS transmission on an aperiodic SRS resource configured by SRS-ResourceSet or SRS-PosResourceSet for the purpose of providing receiver assistance in channel access. The UE 110 is to perform the channel sensing, immediately before the indicated aperiodic SRS resource and transmit the A-SRS if the UE has sensed the channel to be idle in all sensing slots within the sensing duration. The sensing duration may be deterministic or random. The sensing may be carried out in accordance with the type of channel access procedure configured to the UE 110 or in accordance with the type of channel access procedure dynamically indicated in the same DCI. In such case, this instance of the DCI format does not trigger aperiodic SRS resource set(s) for a MIMO usage or positioning purposes.

If the 1-bit flag is present in the DCI format but the value of the designated bits of the SRS request field (2 LSBs in case of 3-bit or 2-bit field in DCI 1_1, or the number of LSBs in DCI 1_2 as configured by srs-RequestDCI-1-2-r16) is set to 00 or 0, the UE ignores the 1-bit flag, because no A-SRS transmission is triggered by this DCI.

If the 1-bit flag is present in the DCI format and is set to 0 or the 1-bit flag is absent, this indicates to the UE 110 that the SRS request field in the same DCI triggers aperiodic SRS resource set(s) configured by SRS-ResourceSet or SRS-PosResourceSet for a MIMO usage or for positioning purposes, respectively, in accordance with the legacy mechanism and sounding procedures.

For DCI format 1_1 with CRC scrambled by C-RNTI, CS-RNTI or MCS-C-RNTI, the 1-bit flag may be present only if one or more of the following conditions is met. In a first condition, the UE 110 may be configured with a higher layer parameter indicating that channel sensing is to be performed at the receiver. The higher layer parameter may further indicate a type for a receiver channel access procedure. In a second condition, the UE 110 may be configured with a higher layer parameter indicating that the 1-bit flag is present in DCI format 1_1, e.g., the 1-bit flag is present in the SRS-Config IE. In a third condition, the UE 110 may be configured with at least one aperiodic SRS resource set with the higher layer parameter, usage, set to a new value such as channelAccess or receiverAssistance. In a fourth condition, the UE 110 may be configured with at least one aperiodic SRS resource (set) with a new higher layer parameter indicating that the resource (set) is configured for the purpose of channel access or receiver assistance.

For DCI format 1_2 with CRC scrambled by C-RNTI, CS-RNTI or MCS-C-RNTI, the 1-bit flag may be present only if the UE 110 is configured with the higher layer parameter srs-RequestDCI-1-2-r16 and one or more of the following conditions is met. In a first condition, the UE 110 may be configured with a higher layer parameter indicating that channel sensing is to be performed at the receiver. The higher layer parameter may further indicate a type for the receiver channel access procedure. In a second condition, the UE 110 may be configured with at least one aperiodic SRS resource set with the higher layer parameter, usage, set to a new value such as channelAccess or receiverAssistance. In a third condition, the UE 110 may be configured with at least one aperiodic SRS resource (set) with a new higher layer parameter indicating that the resource (set) is configured for the purpose of channel access or receiver assistance.

To ensure that a single aperiodic SRS resource is conditionally triggered (e.g., triggered responsive to the UE 110 sensing the channel to be idle) in a case wherein it is indicated to the UE 110 that the SRS request field in the same non-fallback DL assignment DCI scheduling PDSCH(s) triggers A-SRS for the purpose of providing receiver assistance in channel access, one or more of the following UE procedures may be applied. Conveniently, the following UE procedures allow for triggering a single SRS resource in a single SRS resource set.

Among the SRS resource sets indicated by the SRS request field using the configured aperiodicSRS-Resource Trigger or a value of an entry in the configured aperiodicSRS-ResourceTriggerList, as explained hereinbefore, only the SRS resource set with the smallest SRS-ResourceSetId may be considered to be conditionally triggered. In contrast, all other SRS resource sets indicated by that SRS request field are considered not triggered. Within the considered SRS resource set, it is up to the BS 170 to configure a single aperiodic SRS resource for the UE 110 to use. Otherwise, it is up to the BS 170 to configure multiple SRS resources, thereby allowing the UE 110 to select the aperiodic SRS resource with the smallest SRS-ResourceId. In some aspects of the present application, only the SRS resource set with the largest SRS-ResourceSetId and the SRS resource with the largest SRS-ResourceId are considered. Alternatively, in the case that the gNB has configured multiple SRS resources within the considered SRS resource set, the BS 170 may configure only one aperiodic SRS resource with a new higher layer parameter indicating that the resource is configured for the purpose of channel access or receiver assistance.

Alternatively, the UE 110 may be configured with one or more aperiodic SRS resource sets. Each of the aperiodic SRS resource sets may include the higher layer parameter, usage, set to a new value such as channelAccess or receiverAssistance. A such, among the SRS resource sets indicated by the SRS request field using the configured aperiodicSRS-Resource Trigger or a value of an entry in the configured aperiodicSRS-ResourceTriggerList, as explained hereinbefore, only the SRS resource set with the smallest SRS-ResourceSetId is considered to be conditionally triggered from the one or more aperiodic SRS resource sets configured with parameter, usage, set to channelAccess or receiverAssistance. In contrast, all other SRS resource sets indicated by that SRS request field are considered not triggered. It can be specified that, when the higher layer parameter, usage, is set to channelAccess or receiverAssistance for a given SRS resource set, only one SRS resource in the given SRS resource set may be conditionally triggered at a given time instant or a slot. It is up to the BS 170 to configure multiple SRS resources in the given SRS resource set, thereby allowing the UE 110 to select the aperiodic SRS resource with the smallest SRS-ResourceId. In some aspects of the present application, only the SRS resource with the largest SRS-ResourceId is selected. Alternatively, in the case that the gNB has configured multiple SRS resources within the considered SRS resource set, the BS 170 may configure only one aperiodic SRS resource with a new higher layer parameter indicating that the resource is configured for the purpose of channel access or receiver assistance.

In aspects of the present application, it is proposed to introduce a 2-bit field in the non-fallback DL assignment DCI, e.g., DCI format 1_1 with CRC scrambled by C-RNTI, CS-RNTI or MCS-C-RNTI, and use the existing SRS request field to trigger A-SRS transmission(s) for either legacy purposes or for receiver assistance purposes or for both purposes.

For operation with shared spectrum access in FR2-2, the 2-bit field, e.g., SRS trigger mode or Channel access indication, may be added in the non-fallback DL assignment DCI format to be used for scheduling PDSCH(s) and triggering A-SRS as idle indication in the serving cell for the purpose of providing receiver assistance in channel access before the start of the scheduled PDSCH(s). A first state of the 2-bit field indicates triggering an A-SRS transmission for receiver-assisted channel access. A second state of the 2-bit field indicates triggering A-SRS transmission(s) for legacy MIMO/positioning purposes. A third state of the 2-bit field indicates triggering A-SRS transmissions for both for receiver-assisted channel access and for legacy MIMO/positioning purposes. A fourth state of the 2-bit field may be reserved. Furthermore, the UE 110 may be configured with one or more aperiodic SRS resource sets. Each aperiodic SRS resource set may include a higher layer parameter enabling SRS triggering for channel access. Enabling SRS triggering for channel access may be thus achieved by setting the existing higher layer parameter, usage, to a new value such as channelAccess or receiverAssistance. Alternatively, enabling SRS triggering for channel access may be achieved by providing a new higher layer parameter, e.g., SRS-ChannelAccess. The BS 170 may configure the higher layer parameter enabling SRS triggering for channel access for only one SRS resource set including a single SRS resource per BWP.

If the 2-bit field is present in the DCI format and is set to 01, this indicates to the intended receiver UE 110, upon decoding the DCI format, that the SRS request field in the same DCI triggers A-SRS transmission on an aperiodic SRS resource configured by SRS-ResourceSet or SRS-PosResourceSet for the purpose of providing receiver assistance in channel access. In such case, among the SRS resource sets indicated by the SRS request field using the configured aperiodicSRS-Resource Trigger or a value of an entry in the configured aperiodicSRS-ResourceTriggerList, as explained hereinbefore, only the SRS resource set(s) with the higher layer parameter enabling SRS triggering for channel access (e.g., SRS-ChannelAccess) are considered to be conditionally triggered. In contrast, all other SRS resource sets indicated by that SRS request field are considered not triggered, i.e., no SRS resource set for MIMO/Positioning is triggered.

The UE 110 is to perform the channel sensing immediately before the indicated aperiodic SRS resource and transmit the A-SRS if the UE has sensed the channel to be idle in all sensing slots within the sensing duration. The sensing duration may be deterministic or random. The sensing may be carried out in accordance with the type of channel access procedure configured to the UE 110 or in accordance with the type of channel access procedure dynamically indicated in the same DCI.

If the 2-bit field is present in the DCI format and is set to 10, this indicates to the intended receiver UE 110, upon decoding the DCI format, that the SRS request field in the same DCI triggers A-SRS transmission(s) on aperiodic SRS resource(s) configured by SRS-ResourceSet or SRS-PosResourceSet for the purpose of MIMO or positioning, respectively. In such case, among the SRS resource sets indicated by the SRS request field using the configured aperiodicSRS-ResourceTrigger or a value of an entry in the configured aperiodicSRS-ResourceTriggerList, as explained hereinbefore, only those SRS resource set(s) with the higher layer parameter enabling SRS triggering for channel access is not configured are considered to be triggered, i.e., no SRS resource set for receiver assistance is triggered.

If the 2-bit field is present in the DCI format and is set to 11, this indicates to the intended receiver UE 110, upon decoding the DCI format, that the SRS request field in the same DCI triggers A-SRS transmissions on aperiodic SRS resource sets configured by SRS-ResourceSet or SRS-PosResourceSet for the purposes of MIMO or positioning, respectively and for the purposes of receiver assistance. In such case, among the SRS resource sets indicated by the SRS request field using the configured aperiodicSRS-Resource Trigger or a value of an entry in the configured aperiodicSRS-ResourceTriggerList, as explained hereinbefore, only the SRS resource set(s) for which the higher layer parameter enabling SRS triggering for channel access is not configured are considered to be triggered. In contrast, the remaining SRS resource sets (for which the higher layer parameter is configured) are considered to be conditionally triggered.

If the field is present in the DCI format but the value of the designated bits of the SRS request field (2 LSBs in case of 3-bit or 2-bit field in DCI 1_1, or the number of LSBs in DCI 1_2 as configured by srs-RequestDCI-1-2-r16) is set to 00 or 0, the UE ignores the field, because no A-SRS transmission is triggered by this DCI.

If the field is absent in the DCI format, this indicates to the UE 110 that the SRS request field in the same DCI triggers aperiodic SRS resource set(s) configured by SRS-ResourceSet or SRS-PosResourceSet for a MIMO usage or positioning purposes, respectively, in accordance with the legacy mechanism and sounding procedures. The UE 110 may not expect to be configured with one or more aperiodic SRS resource sets, each aperiodic SRS resource set with a higher layer parameter enabling SRS triggering for channel access.

For DCI format 1_1 with CRC scrambled by C-RNTI, CS-RNTI or MCS-C-RNTI, the 2-bit field may be present only if one or more of the following conditions is met. In a first condition, the UE 110 may be configured with the higher layer parameter indicating that channel sensing is to be performed at the receiver. The higher layer parameter may further indicate the type of receiver channel access procedure. In a second condition, the UE 110 may be configured with a higher layer parameter indicating that the 2-bit field is present in DCI format 1_1, e.g., in the SRS-Config IE. In a third condition, the UE 110 may be configured with at least one aperiodic SRS resource set with the higher layer parameter enabling SRS triggering for channel access (a parameter, usage, may be provided and may be set to channelAccess or receiverAssistance or new parameter SRS-ChannelAccess). In a fourth condition, the UE 110 may be configured with at least one aperiodic SRS resource with a new higher layer parameter indicating that the resource is configured for the purpose of channel access or for the purpose of receiver assistance.

For DCI format 1_2 with CRC scrambled by C-RNTI, CS-RNTI or MCS-C-RNTI, the 2-bit field may be present only if the UE 110 is configured with the higher layer parameter srs-RequestDCI-1-2-r16 and one or more of the following conditions is met. In a first condition, the UE 110 may be configured with the higher layer parameter indicating that channel sensing is to be performed at the receiver. The higher layer parameter may further indicate the type of receiver channel access procedure. In a second condition, the UE 110 may be configured with at least one aperiodic SRS resource set with the with the higher layer parameter enabling SRS triggering for channel access (parameter, usage, may be provided and set to channelAccess or receiverAssistance or a new parameter SRS-ChannelAccess may be provided). In a third condition, the UE 110 may be configured with at least one aperiodic SRS resource with a new higher layer parameter indicating that the resource is configured for the purpose of channel access or for the purpose receiver assistance.

In aspects of the present application, it is proposed to introduce a separate SRS request field in the non-fallback DL assignment DCI, e.g., DCI format 1_1 with CRC scrambled by C-RNTI, CS-RNTI or MCS-C-RNTI, to separately trigger A-SRS transmission for the receiver assistance.

For operation with shared spectrum access in FR2-2, a separate SRS request field, e.g., Channel access SRS request, may be added in the non-fallback DL assignment DCI format used for scheduling PDSCH(s) and triggering A-SRS as idle indication in the serving cell for the purpose of providing receiver assistance in channel access before the start of the scheduled PDSCH(s). Furthermore, the UE 110 may be configured with one or more aperiodic SRS resource sets. Each aperiodic SRS resource set may include a higher layer parameter enabling SRS triggering for channel access. Enabling SRS triggering for channel access can be thus achieved either by setting the higher layer parameter, usage, to a new value such as channelAccess or receiverAssistance or by providing a new higher layer parameter, e.g., SRS-ChannelAccess. The BS 170 may configure the higher layer parameter enabling SRS triggering for channel access for only one SRS resource set including a single SRS resource per BWP. As such, the DCI format may trigger A-SRS transmission for receiver assistance, may trigger A-SRS transmission(s) for the legacy MIMO/positioning purposes or may trigger A-SRS transmission(s) for both.

If the field Channel access SRS request is present in the DCI format and is set to a value other than 0, this indicates to the intended receiver UE 110, upon decoding the DCI format, that the Channel access SRS request field in the same DCI triggers A-SRS transmission on an aperiodic SRS resource configured by SRS-ResourceSet or SRS-PosResourceSet for the purpose of providing receiver assistance in channel access. In such case, among the SRS resource sets indicated by the Channel access SRS request field using the configured aperiodicSRS-Resource Trigger or a value of an entry in the configured aperiodicSRS-ResourceTriggerList, as explained hereinbefore, only the SRS resource set(s) for which the higher layer parameter enabling SRS triggering for channel access (e.g., SRS-ChannelAccess or parameter, usage, set to channelAccess or receiverAssistance) are considered to be conditionally triggered. In contrast, all other SRS resource sets indicated by that SRS request field are considered not triggered, i.e., no SRS resource set for MIMO/Positioning is triggered by the Channel access SRS request field.

The UE 110 is to perform the channel sensing immediately before the indicated aperiodic SRS resource and transmit the A-SRS if the UE has sensed the channel to be idle in all sensing slots within the sensing duration. The sensing duration may be deterministic or random. The UE 110 may perform the channel sensing in accordance with the type of channel access procedure configured to the UE 110 or the UE 110 may perform the channel sensing in accordance with the type of channel access procedure dynamically indicated in the same DCI.

If the legacy SRS request field is present in the DCI format and is set to a value other than 0, this indicates to the intended receiver UE 110, upon decoding the DCI format, that the SRS request field in the same DCI triggers A-SRS transmission(s) on aperiodic SRS resource(s) configured by SRS-ResourceSet or SRS-PosResourceSet for the purpose of MIMO or for the purpose of positioning, respectively. In such case, among the SRS resource sets indicated by the SRS request field using the configured aperiodicSRS-Resource Trigger or a value of an entry in the configured aperiodicSRS-ResourceTriggerList, as explained hereinbefore, only the SRS resource set(s) for which the higher layer parameter enabling SRS triggering for channel access is not configured are considered to be triggered, i.e., no SRS resource set for receiver assistance is triggered by the SRS request field.

If the Channel access SRS request field is absent in the DCI format, this indicates to the UE 110 that the SRS request field in the same DCI triggers aperiodic SRS resource set(s) configured by SRS-ResourceSet or SRS-PosResourceSet for MIMO usage purposes or for positioning purposes, respectively, in accordance with the legacy mechanism and sounding procedures. The UE 110 may not expect to be configured with one or more aperiodic SRS resource sets, each with a higher layer parameter enabling SRS triggering for channel access.

For DCI format 1_1 with CRC scrambled by C-RNTI, CS-RNTI or MCS-C-RNTI, the field size may be fixed to 2 bits or 1 bit, if present. In such case, the field may be present only if one or more of the following conditions is met. In a first condition, the UE 110 may be configured with the higher layer parameter indicating that channel sensing is to be performed at the receiver. The higher layer parameter may further indicate the type of receiver channel access procedure. In a second condition, the UE 110 may be configured with a higher layer parameter indicating that the field is present in DCI format 1_1, e.g., in the SRS-Config IE. In a third condition, the UE 110 may be configured with at least one aperiodic SRS resource set with the with the higher layer parameter enabling SRS triggering for channel access (parameter, usage, may be provided and set to channelAccess or receiverAssistance or a new parameter SRS-ChannelAccess may be provided). In a fourth condition, the UE 110 may be configured with at least one aperiodic SRS resource with a new higher layer parameter indicating that the resource is configured for the purpose of channel access or for the purpose of receiver assistance.

Alternatively, for DCI format 1_1 with CRC scrambled by C-RNTI, CS-RNTI or MCS-C-RNTI, the field size, e.g., 2 bits or 1 bit, may be configurable by a new higher layer parameter indicating the presence of the field in the DCI format, e.g., srs-RequestChannelAccessDCI-1-1-r17 in SRS-Config IE. In such case, the field presence in the DCI format 1_1 may apply similar conditions to following DCI format 1_2.

For DCI format 1_2 with CRC scrambled by C-RNTI, CS-RNTI or MCS-C-RNTI, the field size, e.g., 2 bits or 1 bit, may be configurable by a new higher layer parameter indicating the presence of the field in the DCI format, e.g., srs-RequestChannelAccessDCI-1-2-r17 in SRS-Config IE. The field may be present only if the UE 110 is configured with the higher layer parameter srs-RequestChannelAccessDCI-1-2-r17 and one or more of the following conditions is met. In a first condition, the UE 110 may be configured with the higher layer parameter indicating that channel sensing is to be performed at the receiver. The higher layer parameter may further indicate the type of receiver channel access procedure. In a second condition, the UE 110 may be configured with at least one aperiodic SRS resource set with the with the higher layer parameter enabling SRS triggering for channel access (parameter, usage, may be provided and set to channelAccess or receiverAssistance or a new parameter SRS-ChannelAccess may be provided). In a third condition, the UE 110 may be configured with at least one aperiodic SRS resource with a new higher layer parameter indicating that the resource is configured for the purpose of channel access or the purpose of receiver assistance.

In the second and third broad aspects of the present application, and still considering the DL scenario, wherein the UE 110 is the intended receiver and the BS 170 is the transmitter, the focus in the following is on the case in which the UE 110 uses a PUCCH scheduled by the BS 170 in the DL assignment DCI scheduling one or more subsequent PDSCH(s), to transmit, to the BS 170, the "idle channel" indication as receiver-assistance information. Recall that, rather than simply detecting a binary condition, that is, whether a channel is busy or idle, receiver channel sensing may be defined as determining a level of interference by the UE 110, e.g., the energy measured over the sensing duration at the physical layer (L1). Given that the PUCCH is a physical channel that can carry an uplink control information (UCI) payload, the determined level of interference may also be reported to the BS 170, as the UCI payload or a part thereof. It follows that, upon the UE 110 sensing the channel to be idle immediately before the indicated PUCCH resource, which occurs before the start of PDSCHs scheduled by the same DL assignment DCI, the UE 110 may transmit the scheduled PUCCH to indicate idle channel with a UCI payload size of either 1 bit (in the case of binary indication only) or a plurality of bits, e.g., 7 bits (in the case of reporting of the determined level of interference as well).

In order to facilitate the reporting of the determined level of interference, the UE 110 may be configured, by higher layers, with a new IE providing configuration parameters for a new CSI report, e.g., CSI-ReportConfig-r17, including one or more of a report size in bits per sensed channel, a new report Quantity, a measurement duration, and an EDT threshold below which the channel is sensed to be idle. The new reportQuantity may be set to L1-RSSI. The report size may be set to 7 bits per sensed channel, representing a quantized value of energy measured over the sensing duration at the physical layer (L1) within a dB range, e.g., [−140, −44] dB.

In this way, the UE 110 may determine the UCI payload size to be transmitted as idle indication on the scheduled PUCCH, i.e., 1 bit or the plurality of bits, based on the report size provided in the new IE. Alternatively, the UE 110 may determine the UCI payload size based on an additional higher layer parameter providing the receiver assistance information report type, e.g., binary or measurement report.

It should be understood that existing mechanisms in 3GPP Rel-15/16 enable scheduling PUCCH on a pre-configured PUCCH resource by non-fallback DCI formats (i.e., DCI 1_1 and DCI 1_2 in the DL scheduling scenario) yet, for the primary purpose of providing HARQ-ACK information in the UCI in response to PDSCH(s) reception scheduled by the same DCI and/or earlier DCIs. It should be noted though that UCI, in general, refers to a combination of one or more of HARQ-ACK feedback, scheduling request (SR) and CSI. That is, the UCI bit sequence to be transmitted on a PUCCH may be generated from HARQ-ACK/SR bits only, CSI bits only, or from both HARQ-ACK/SR bits and CSI bits. Therefore, the UE may be configured with more than one PUCCH resource set (at most four) and may be also provided with the higher layer parameter simultaneousHARQ-ACK-CSI in which case the UE multiplexes HARQ-ACK information, with or without SR, and CSI report(s) in a same PUCCH Format 2, 3 or 4, or if simultaneousHARQ-ACK-CSI is not provided otherwise, the UE drops the CSI report(s) and includes only DL HARQ-ACK information, with or without SR, in the PUCCH. The UE 110 typically uses the total UCI payload size to determine the applicable PUCCH resource set and then uses the PUCCH resource indicator field in the scheduling DCI to identify the indicated PUCCH resource within the applicable PUCCH resource set, wherein each PUCCH resource is at least configured with an identifier (pucch-ResourceId), a PUCCH format (0 . . . 4), and time-frequency resources.

It follows that, for operation with shared spectrum access in the frequency range FR2-2 or above, a method is needed to leverage the existing PUCCH scheduling mechanism for the distinct purpose of transmitting the idle indication as receiver assistance information before the start of the scheduled PDSCH(s). To establish appropriate conditions for the scheduling mechanism, channel sensing by the receiver (steps 616 and 816U) is carried out. Additionally, the transmission of a PUCCH (steps 617 and 817) is conditional upon sensing the channel to be idle. Moreover, a UE 110 that supports receiver-assisted channel access should also be able to support multiplexing, in the UCI reported in that PUCCH, the new CSI report type for idle indication with other existing UCI report types, e.g., HARQ-ACK information. The UE 110 may determine whether to multiplex UCI reports based on configuration and the timing/priority of UCI reports.

It should be noted, also, that, in the existing PUCCH scheduling mechanism, the location of the PUCCH resource in time domain may be dynamically indicated by the PDSCH-to-HARQ_feedback timing indicator field in the DL DCI, which field is a slot level offset from a last slot where the scheduled PDSCH(s) reception ends to the slot where the PUCCH resource is to be transmitted. The PDSCH-to-HARQ_feedback timing indicator field values, if present, map to values for a set of number of slots provided by the high layer parameters dl-DataToUL-ACK, dl-DataToUL-ACK-r16, or dl-DataToUL-ACKForDCIFormat1_2. However, if the PDSCH-to-HARQ_feedback timing indicator is absent, then an offset value is provided by dl-DataToUL-ACK, dl-DataToUL-ACK-r16, or dl-DataToUL-ACKForDCIFormat1_2. The parameter dl-DataToUL-ACK applies to DCI format 1_1 and dl-DataToUL-ACK-DCI-1-2 applies to DCI format 1_2. If dl-DataToUL-ACK-r16 is provided, the UE 110 shall ignore the dl-DataToUL-ACK. Indicating the value −1 from dl-DataToUL-ACK-r16 corresponds to indicating "non-numerical value" for the case where the HARQ-ACK feedback timing is not explicitly included at the time of scheduling PDSCH, in which case the HARQ-ACK feedback is expected to be transmitted in a later PUCCH resource scheduled by a later DCI using the PDSCH-to-HARQ_feedback timing indicator field, if present, or otherwise using the offset value provided by dl-DataToUL-ACK, dl-DataToUL-ACK-r16, or dl-DataToUL-ACKForDCIFormat1_2

In aspects of the present application, it is proposed to introduce a separate new PUCCH resource indicator field in the non-fallback DL assignment DCI, e.g., DCI format 1_1 with CRC scrambled by C-RNTI, CS-RNTI or MCS-C-RNTI, to, thereby, separately indicate the PUCCH resource for transmitting the receiver assistance information.

For operation with shared spectrum access in FR2-2 or above, a separate field, e.g., a ChannelAccess-PUCCH resource indicator, may be added in the non-fallback DL assignment DCI format used for scheduling PDSCH(s) and scheduling PUCCH as idle indication in the serving cell for the purpose of providing receiver assistance in channel access before the start of the scheduled PDSCH(s).

For DCI format 1_1 with CRC scrambled by C-RNTI, CS-RNTI or MCS-C-RNTI, the field size may be fixed to 3 bits, if present. In such case, the field may be present only if one or more of the following conditions is met. In a first condition, the UE 110 may be configured with the higher layer parameter indicating that channel sensing is to be performed at the receiver. The higher layer parameter may further indicate the type of receiver channel access procedure. In a second condition, the UE 110 may be configured with a higher layer parameter indicating that the field is present in DCI format 1_1, e.g., in the PUCCH-Config IE. In a third condition, the UE 110 may be configured with the higher layer parameter providing the report size in the new IE, e.g., CSI-ReportConfig-r17 or the higher layer parameter providing the receiver assistance information report type.

Alternatively, for DCI format 1_1 with CRC scrambled by C-RNTI, CS-RNTI or MCS-C-RNTI, the field size may be configurable to 0, 1, 2, or 3 bits by a new higher layer parameter indicating the size of the field in the DCI format, e.g., numberOfBitsForChannelAccessPUCCH-ResourceIndicatorDCI-1-1 in PUCCH-Config IE. In such case, the field presence in the DCI format 1_1 may apply similar conditions to following DCI format 1_2.

For DCI format 1_2 with CRC scrambled by C-RNTI, CS-RNTI or MCS-C-RNTI, the field size may be configurable to 0, 1, 2, or 3 bits by a new higher layer parameter indicating the size of the field in the DCI format, e.g., numberOfBitsForChannelAccessPUCCH-ResourceIndicatorDCI-1-2 in PUCCH-Config 1E. The field may be present only if the configured size is other than 0 bits. In some aspects of the present application, the field may be present only if one or more of the following additional conditions is met. In a first condition, the UE 110 may be configured with the higher layer parameter indicating that channel sensing is to be performed at the receiver. The higher layer parameter may further indicate the type of receiver channel access procedure. In a second condition, the UE 110 may be configured with the higher layer parameter providing the report size in the new IE, e.g., CSI-ReportConfig-r17 or the higher layer parameter providing the receiver assistance information report type.

Recall that scheduling PUCCH transmission for providing receiver assistance information is intended for reporting the interference condition to the transmitter BS 170 at the intended receiver UE 110. Transmitting the PUCCH as an idle indication should be, thus, as close as possible, in time domain, to the start of the scheduled PDSCH(s) for the reporting to be relevant, e.g., the UE 110 expects that the scheduled PUCCH transmission should start, at most, N symbols before the start of the scheduled PDSCH(s). Once again, the number of symbols, N, may be determined based on one or more of the subcarrier spacing of the active BWP, the subcarrier spacing of the scheduling PDCCH, the UE 110 capability and the UE 110 mobility/channel model. The minimum number of symbols from the start of the PUCCH transmission to the start of the scheduled PDSCH(s) (<N) may also be determined based on one or more of the subcarrier spacing of the active BWP, the UE 110 capability on the time requirements to switch from transmitting to receiving using a same or different spatial domain filter, and the BS's processing time of PUCCH.

Because the scheduled PUCCH transmission for providing receiver assistance information is intended to be before the start of the scheduled PDSCH(s) reception, rather than after the end of it as typically indicated by the legacy PDSCH-to-HARQ_feedback timing indicator field and its associated high layer parameters, it is further proposed to introduce a new separate timing indicator field, e.g., a ChannelAccess-PUCCH-to-PDSCH timing indicator in the same non-fallback DL assignment DCI. The field may be of a configurable size (0, 1 or 2 bits) to indicate a slot level offset k from slot n of the indicated PUCCH resource to slot n+k, where the scheduled PDSCH(s) reception starts. The slot offset k may be selected from a specified set of number of slots, e.g., {0,1} or {0,1,2,3}. The UE 110 may be configured with a new high layer parameter, e.g., in PUCCH-Config IE, providing the field size in the non-fallback DL DCI format, e.g., numberOfBitsForChannelAccess-PucchToDLData-DCI-1-1 for DCI format 1_1 and numberOfBitsForChannelAccess-PucchToDLData-DCI-1-2 for DCI format 1_2. If the field is absent, i.e., the field is configured with a 0-bit size, a default value of k is assumed, e.g., 0 slots, which means that the PUCCH resource occurs in leading symbols of a same slot where the scheduled PDSCH(s) reception starts. Note that for the symbol level granularity, the UE determines the PUCCH resource including its time-frequency resources based on the value of ChannelAccess-PUCCH resource indicator in the same DCI and the total UCI payload size as explained hereinbefore.

If the field ChannelAccess-PUCCH resource indicator is present in the DCI format, this indicates to the intended receiver UE 110, upon decoding the DCI format, that the DCI format schedules a PUCCH transmission on a preconfigured PUCCH resource for the purpose of providing receiver assistance in channel access before the start of the scheduled PDSCH(s) reception. In such case, the UE 110 determines a slot n in which the scheduled PUCCH resource is indicated based on whether the field ChannelAccess-PUCCH-to-PDSCH timing indicator is present in the same DCI and the slot offset value indicted thereby as explained hereinbefore.

As for determining the total UCI payload size and for the UCI bit sequence generation, if the UE 110 determines that no HARQ-ACK information has been requested on a PUCCH resource or a PUSCH resource overlapping in time with the PUCCH scheduled for providing receiver assistance in channel access, the UE 110 may determine the total UCI payload size as the configured new CSI report size, e.g., 1 bit or 7 bits for energy measurement, as explained hereinbefore, and may generate the UCI bit sequence in accordance with the procedure for reporting HARQ-ACK only on PUCCH starting from the MSB to the LSB. Alternatively, it may be specified that the UE generates the UCI bit sequence in accordance with the procedure for reporting CSI, e.g., CSI part1, only on PUCCH starting from the MSB to the LSB. However, if the UE 110 determines that HARQ-ACK information has been requested on a PUCCH resource or a PUSCH resource overlapping in time with the PUCCH scheduled for providing receiver assistance in channel access, and the UE 110 is provided with the parameter simultaneousHARQ-ACK-CSI, the UE 110 may append the HARQ-ACK bits with the new CSI report bits, e.g., 1 bit or 7 bits for energy measurement starting from the MSB to the LSB, and may determine the total UCI payload size as the sum of the HARQ-ACK bits and the configured new CSI report size. The UE 110 may then generate the UCI bit sequence in accordance with the procedure for reporting HARQ-ACK only on PUCCH. The applicable PUCCH resource set and the PUCCH resource can be thus determined as explained hereinbefore.

The UE 110 is to perform the channel sensing immediately before the indicated PUCCH resource and transmit the PUCCH if the UE 110 has sensed the channel to be idle in all sensing slots within the sensing duration. The sensing duration may be deterministic or random. The UE 110 may perform the channel sensing in accordance with the type of channel access procedure configured to the UE 110 or the UE 110 may perform the channel sensing in accordance with the type of channel access procedure dynamically indicated in the same DCI.

If the field ChannelAccess-PUCCH resource indicator is absent in the DCI format, yet the timing field ChannelAccess-PUCCH-to-PDSCH timing indicator is present in the same DCI, this indicates to the intended receiver UE 110, upon decoding the DCI format, that the DCI format schedules a PUCCH transmission on a first PUCCH resource provided by pucch-ResourceId obtained from the first value of a higher layer parameter resourceList, for the purpose of providing receiver assistance. The remaining procedures are the same as explained previously for the case in which the field ChannelAccess-PUCCH resource indicator is present in the DCI.

In the following, the focus is on the UL scenario, wherein the BS 170 is the intended receiver and the UE 110 is the transmitter. In particular, the focus in the following is on the case in which the BS 170 uses an aperiodic NZP CSI-RS triggered by the BS 170 in the UL grant DCI scheduling one or more subsequent PUSCH(s), to transmit to the UE 110, the "idle channel" indication as receiver-assistance information. It should be noted that such triggering mechanism may be applicable to the case in which the slot offset K2 for scheduled PUSCHs is too large for the channel sensing performed by the gNB before transmitting the UL grant to be representative of the interference experienced during the gNB's reception of the scheduled PUSCH(s).

In aspects of the present application, it is proposed to introduce a 2-bit field in the non-fallback DL assignment DCI, e.g., DCI format 1_1 with CRC scrambled by C-RNTI, CS-RNTI or MCS-C-RNTI, and use the existing CSI request field to trigger NZP aperiodic CSI-RS transmission(s) for either legacy purposes or for receiver assistance purposes or for both purposes. For operation with shared spectrum access in FR2-2, the 2-bit field, e.g., CSI-RS trigger mode or Channel access indication, may be added in the non-fallback UL grant DCI format to be used for scheduling PUSCH(s) and triggering NZP AP-CSI-RS as idle indication in the serving cell for the purpose of providing receiver assistance in channel access before the start of the scheduled PUSCH(s). A first state of the 2-bit field indicates triggering an NZP AP-CSI-RS transmission for receiver-assisted channel access. A second state of the 2-bit field indicates triggering NZP AP-CSI-RS transmission(s) for legacy channel/interference measurement purposes. A third state of the 2-bit field indicates triggering NZP AP-CSI-RS transmissions for both for receiver-assisted channel access and for legacy channel/interference measurement purposes. A fourth state of the 2-bit field may be reserved. Furthermore, the UE 110 may be configured with one or more aperiodic SRS resource sets. Each aperiodic CSI-RS resource set may include a higher layer parameter enabling NZP AP-CSI-RS triggering for channel access e.g., CSI-RS-ChannelAccess. The BS 170 may configure the higher layer parameter enabling NZP AP-CSI-RS triggering for channel access for only one aperiodic CSI-RS resource set per trigger state indicated by CSI request in the UL grant from the higher layer configured list CSI-AperiodicTriggerStateList. Given that for each aperiodic CSI-RS resource in a CSI-RS resource set associated with each CSI triggering state, the UE 110 is configured with a TCI state, i.e., QCL configuration of QCL RS source and QCL type(s), through higher layer signaling of qcl-info, the UE 110 may expect that only an aperiodic CSI-RS resource configured with a TCI state that is same as or QCLed with a TCI state associated with the reception of the PDCCH carrying the triggering UL grant DCI is triggered from the aperiodic CSI-RS resource set indicated by the CSI request field.

Given that triggering NZP AP-CSI-RS transmission for providing receiver assistance information is intended for reporting relevant interference measurement, transmitting the NZP AP-CSI-RS should be as close as possible in time domain to the start of the scheduled PUSCH(s), e.g., at most N symbols before the start of the scheduled PDSCH(s). As such, UE can be configured with a time offset of a small value range for the triggered NZP AP-CSI-RS resource set with respect to the beginning of the scheduled PUSCH(s). In some aspects of the present application, the existing higher layer parameter aperiodicTriggeringOffset or aperiodicTriggeringOffset-r16 may be reinterpreted to rather indicate a number of slots from a slot where the aperiodic CSI-RS resource set is triggered and a slot where the transmission of the scheduled PUSCH(s) starts.

A fourth broad aspect of the present application relates to a scenario wherein neither the first higher layer parameter nor the second higher layer parameter is provided while the CC is configured for operation in a mmWave shared spectrum. It follows that neither the transmitter nor the intended receiver is expected to perform channel sensing before the transmitter initiates a CO on the serving cell.

The UE 110 may expect to be provided with some higher layer parameters, in a single IE or in several distinct IEs. The received higher layer parameters may indicate and/or be related to one or more of the following types of channel access mechanisms without channel sensing: a dynamic power control/adaptive transmit power control (ATPC) channel access mechanism; an adaptive duty cycle channel access mechanism; and a dynamic channel selection/dynamic frequency selection (DFS) channel access mechanism.

For the ATPC channel access mechanism, the received higher layer parameters may indicate one or more of: an ATPC periodicity, for which transmission power level is assumed constant at least for DL reception/channel estimation; a link budget margin within which transmission power can be reduced for a target modulation and coding scheme; a target block error rate (BLER); a target SINR; etc.

For the adaptive duty cycle channel access mechanism, the received higher layer parameters may indicate one or more of: a channel occupancy/utilization measurement/feedback periodicity; a measurement energy detection threshold; a target long-term duty cycle; a maximum channel occupancy time in a given frame; a minimum OFF/idle period, which may be expressed as a minimum number of consecutive slots/symbols before the beginning of a subsequent CO; etc.

For the DFS channel access mechanism, the received higher layer parameters may indicate one or more of: a channel availability assessment period; a maximum interference threshold; a channel switching delay; etc.

The higher layer parameters that indicate and/or may be related to the one or more of types of channel access mechanisms without channel sensing may be determined and provided to the UE 110 based on a capability of the UE 110 for signaling per serving cell or per band of operation.

The fourth broad aspect of the present application, relating to the scenario wherein neither the first higher layer parameter nor the second higher layer parameter is provided, may be shown to conveniently provide supporting parameters of potential standard impact and pertaining to the alternative channel access and interference mitigation techniques when a channel access mechanism without channel sensing is configured for the serving cell.

It should be appreciated that one or more steps of the embodiment methods provided herein may be performed by corresponding units or modules. For example, data may be transmitted by a transmitting unit or a transmitting module. Data may be received by a receiving unit or a receiving module. Data may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

Although this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method for of operating a user equipment (UE) in a millimeter wave shared spectrum, the method comprising:
    receiving, by the UE, higher layer information, the higher layer information allowing the UE to operate with shared spectrum access in a serving cell within the millimeter wave shared spectrum, wherein the higher layer information includes an indicator that indicates a channel access mode; and
    transmitting, subsequent to determining that the channel is idle using channel sensing on the channel, by the UE, an uplink (UL) transmission burst on a channel in the serving cell to, thereby, initiate channel occupancy on the channel;
    wherein,
    the channel sensing is performed, by the UE, in accordance with a channel sensing type determined in accordance with the channel access mode, the channel sensing type comprising a directional channel sensing type.

2. The method of claim 1, wherein the receiving, by the UE, the higher layer information comprises receiving, the higher layer information via common signaling or dedicated signaling providing cell-specific parameters.

3. The method in claim 1, further comprising receiving, by the UE, at least one of:
    spatial relation information with respect to:
        an UL reference signal; or
        a downlink (DL) reference signal; and
    a transmission configuration indication (TCI) state that is Quasi Co-Located (QCL) with respect to a DL reference signal.

4. The method in claim 3, wherein the UE further receives an indication of an uplink sounding reference signal resource indicator (SRI) for an UL transmission in the UL transmission burst and the UE uses a spatial sensing filter to perform the channel sensing, wherein the spatial sensing filter is the same as a spatial transmit filter associated with the SRI.

5. The method in claim 3, wherein the UE is further with receives for an UL transmission in the UL transmission burst, an indication of a TCI state associated with a received DL reference signal and the UE uses a spatial sensing filter to perform the channel sensing, wherein the spatial sensing filter is the same as a spatial receive filter the UE uses to receive the DL reference signal associated with the TCI state.

6. The method of claim 1, wherein the UL transmission burst is a set of UL transmissions without any gaps, or with gaps such that each gap duration is no greater than a specific value, the specific value is one of 3 µs and 8 µs.

7. A device configured for operation in a millimeter wave shared spectrum, the device comprising:
    a memory storing instructions; and
    a processor caused, by executing the instructions, to:
        receive higher layer information, the higher layer information indicating the device to operate with shared spectrum access in a serving cell within the millimeter wave shared spectrum, wherein the higher layer information includes an indicator that indicates a channel access mode; and
        transmit, subsequent to determining that the channel is idle using channel sensing on the channel, an uplink (UL) transmission burst on a channel in the serving cell to, thereby, initiate channel occupancy on the channel;
    wherein, the processor is caused to
    perform the channel sensing in accordance with a channel sensing type that the processor has determined in accordance with the channel access mode, the channel sensing type comprising a directional channel sensing type.

8. The device of claim 7, wherein the instructions cause the processor to receive the higher layer information via common signaling or dedicated signaling providing cell-specific parameters.

9. The device of claim 7, wherein the instructions cause the processor to receive the higher layer information in device-specific signaling.

10. The device of claim 7, wherein the instructions further cause the processor to receive at least one of:
    a spatial relation information with respect to:
        an UL reference signal; or
        a downlink (DL) reference signal; and
    a transmission configuration indication (TCI) state that is Quasi Co-Located (QCL) with respect to a DL reference signal.

11. The device of claim 10, wherein the instructions further cause the processor to receive an indication of an uplink sounding reference signal resource indicator (SRI) for an UL transmission in the UL transmission burst and the instructions further cause the processor to use a spatial sensing filter to perform the channel sensing, wherein the spatial sensing filter is the same as a spatial transmit filter associated with the SRI.

12. The device of claim 10, wherein the instructions further cause the processor to receive, for an UL transmission in the UL transmission burst, an indication of a TCI state associated with a received DL reference signal and the instructions further cause the processor to use a spatial sensing filter to perform the channel sensing, wherein the spatial sensing filter is the same as a spatial receive filter that the processor uses to receive the DL reference signal associated with the TCI state.

13. The device of claim 7, wherein the UL transmission burst is a set of UL transmissions without any gaps, or with gaps such that each gap duration is no greater than a specific value, the specific value is one of 3 µs and 8 µs.

14. The method of claim 6, wherein separate UL transmission bursts to be transmitted subsequent to determining that the channel is idle using channel sensing on the channel include transmissions separated by a gap duration greater than the specific value.

15. The device of claim 13, wherein UL transmission bursts to be transmitted subsequent to the channel being determined to be idle using channel sensing on the channel are separated by a gap duration greater than the specific value.

16. A method of controlling a user equipment (UE) in a millimeter wave shared spectrum, the method comprising:
transmitting, by a base station (BS) to the UE, higher layer information, the higher layer information indicating the UE to operate with shared spectrum access in a serving cell within the millimeter wave shared spectrum, wherein the higher layer information includes an indicator that indicates a channel access mode; and
transmitting, by the BS to the UE and subsequent to determining that a channel is idle using channel sensing on the channel, a downlink (DL) transmission burst on the channel in the serving cell to, thereby, initiate channel occupancy on the channel,
wherein
the channel sensing is performed, by the BS, in accordance with a channel sensing type associated with the channel access mode, the channel sensing type comprising a directional channel sensing type.

17. The method of claim 16, wherein the transmitting, by the BS, the higher layer information, comprises transmitting the higher layer information via common signaling or dedicated signaling providing cell-specific parameters.

18. The method of claim 16, wherein the transmitting, by the BS, the higher layer information, comprises transmitting UE-specific signaling including the higher layer information.

19. The method of claim 16, wherein the DL transmission burst is a set of DL transmissions without any gaps, or with gaps such that each gap duration is no greater than a specific value, the specific value is one of 3 µs and 8 µs.

20. The method of claim 19, wherein DL transmission bursts to be transmitted subsequent to determining that the channel is idle using channel sensing on the channel include transmissions separated by a gap duration greater than the specific value.

21. A device configured for operation in a millimeter wave shared spectrum, the device comprising:
a memory storing instructions; and
a processor caused, by executing the instructions, to:
transmit, to a user equipment (UE), higher layer information, the higher layer information indicating the UE to operate with shared spectrum access in a serving cell within the millimeter wave shared spectrum, wherein the higher layer information includes an indicator that indicates a channel access mode; and
transmit, to the UE, subsequent to determining that a channel is idle using channel sensing on the channel, a downlink (DL) transmission burst on the channel in the serving cell to, thereby, initiate channel occupancy on the channel,
wherein, if the higher layer information includes an indicator indicates a channel access mode, the transmitting is subsequent to determining that the channel is idle using channel sensing on the channel; and
wherein
the channel sensing is caused to be performed, by the processor, in accordance with a channel sensing type associated with the channel access mode, the channel sensing type comprising a directional channel sensing type.

22. The device of claim 21, wherein the instructions that cause the processor to transmit the higher layer information comprise instructions that cause the processor to transmit the higher layer information via common signaling or dedicated signaling providing cell-specific parameters.

23. The device of claim 21, wherein the instructions that cause the processor to transmit the higher layer information the comprise instructions that cause the processor to transmit UE-specific signaling including the higher layer information.

24. The device of claim 21, wherein the DL transmission burst is a set of DL transmissions without any gaps, or with gaps such that each gap duration is no greater than a specific value, the specific value is one of 3 µs and 8 µs.

25. The device of claim 24, wherein DL transmission bursts to be transmitted subsequent to determining that the channel is idle using channel sensing on the channel include transmissions separated by a gap duration greater than the specific value.

26. The method of claim 3, wherein an UL transmission in the UL transmission burst comprises a physical uplink control channel (PUCCH) transmission or a sounding reference signal (SRS) transmission and the performing the channel sensing comprises using a spatial sensing filter, wherein the spatial sensing filter is the same as:
a spatial domain filter associated with the UL reference signal of the corresponding spatial relation information; or
a spatial domain filter associated with the DL reference signal of the corresponding spatial relation information.

27. The method of claim 26, wherein the spatial relation information comprises multiple spatial relation information corresponding to the UL transmission in the UL transmission burst and the UE further receives an indication to activate one spatial relation information of the multiple spatial relation information, thereby leading to activated spatial relation information, wherein the UE uses a spatial sensing filter to perform the channel sensing, that is same as:
a spatial domain filter associated with the UL reference signal of the activated spatial relation information; or
a spatial domain filter associated with the DL reference signal of the activated spatial relation information.

28. The method of claim 1, wherein an UL transmission in the UL transmission burst is scheduled by a downlink control information (DCI) and the DCI includes an indication of a channel access procedure, wherein the method further comprises performing the channel sensing further in accordance with the indicated channel access procedure.

29. The method of claim 1, further comprising, responsive to determining that the higher layer information includes the indicator that indicates the channel access mode, performing, by the UE, channel sensing in accordance with a channel access procedure, wherein an UL transmission in the UL transmission burst is scheduled by a downlink control information (DCI) and the DCI includes a dynamic indication of the channel access procedure.

* * * * *

UNITED STATES PATENT AND TRADEMARK OFFICE
CERTIFICATE OF CORRECTION

| | |
|---|---|
| PATENT NO. | : 11,889,548 B2 |
| APPLICATION NO. | : 17/504200 |
| DATED | : January 30, 2024 |
| INVENTOR(S) | : Mohamed Adel Salem et al. |

It is certified that error appears in the above-identified patent and that said Letters Patent is hereby corrected as shown below:

In the Claims

Column 41, Line 60, Claim 5:
"The method in claim 3, wherein the UE is further with..."
Should be:
-- The method in claim 3, wherein the UE further... --

Column 44, Lines 12 to 13, Claim 23:
"...higher layer information the comprise instructions that cause the processor to transmit the..."
Should be:
-- ...higher layer information comprise instructions that cause the processor to transmit the... --

Signed and Sealed this
Fourteenth Day of May, 2024

Katherine Kelly Vidal
*Director of the United States Patent and Trademark Office*